US012025928B2

(12) United States Patent
Kobayashi

(10) Patent No.: US 12,025,928 B2
(45) Date of Patent: Jul. 2, 2024

(54) IMAGE FORMING APPARATUS OPERABLE IN MODE FOR FORMING TEST CHART USING PLURAL TEST VOLTAGES

(71) Applicant: CANON KABUSHIKI KAISHA, Tokyo (JP)

(72) Inventor: Masato Kobayashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/696,179

(22) Filed: Mar. 16, 2022

(65) Prior Publication Data

US 2022/0308505 A1 Sep. 29, 2022

(30) Foreign Application Priority Data

Mar. 25, 2021 (JP) ................................ 2021-052483

(51) Int. Cl.
*G03G 15/16* (2006.01)
*G03G 15/00* (2006.01)

(52) U.S. Cl.
CPC ..... *G03G 15/1675* (2013.01); *G03G 15/5029* (2013.01); *G03G 15/5037* (2013.01); *G03G 15/5058* (2013.01); *G03G 15/5062* (2013.01)

(58) Field of Classification Search
CPC ........... G03G 15/1675; G03G 15/5062; G03G 15/5029
See application file for complete search history.

(56) References Cited

U.S. PATENT DOCUMENTS

| | | | | |
|---|---|---|---|---|
| 7,003,237 | B2 | 2/2006 | Miyamoto et al. | |
| 8,843,003 | B2 | 9/2014 | Nakao | |
| 9,977,399 | B2 | 5/2018 | Kobayashi | |
| 2022/0091552 | A1* | 3/2022 | Kakehi .............. | G03G 15/1675 |

FOREIGN PATENT DOCUMENTS

| | | | |
|---|---|---|---|
| JP | 2004-280003 | A | 10/2004 |
| JP | 2012-123309 | A | 6/2012 |
| JP | 2013-037185 | A | 2/2013 |
| JP | 2018-004828 | A | 1/2018 |

* cited by examiner

*Primary Examiner* — Arlene Heredia
(74) *Attorney, Agent, or Firm* — Venable LLP

(57) ABSTRACT

An image forming apparatus includes an image forming portion, an image bearing member, a transfer member, a voltage applying portion, a detecting portion, and a controller capable of executing an operation in an adjustment mode in which a chart on which a plurality of test images are transferred by stepwise changing a test voltage applied to the transfer member by the applying portion is formed on a recording material and then a transfer voltage applied to the transfer member by the voltage applying portion during transfer of the toner image is adjusted. The controller is capable of changing a change width per level of the test voltage applied during formation of the chart[[,]] on the basis of a detection result of the detecting portion when the voltage is applied to the transfer member when the recording material on which the chart is formed is in the transfer portion.

5 Claims, 14 Drawing Sheets

| | | AMBIENT WATER CONTENT (g/kg) | | | | |
|---|---|---|---|---|---|---|
| | | 0.9 ≥ | ··· | 8.9 | ··· | 21.5 ≤ |
| BASIS WEIGHT (g/m²) | · | · | | · | | · |
| | · | · | | · | | · |
| | 81～100 | 1000V | ··· | 500V | ··· | 200V |
| | 101～125 | 1150V | ··· | 600V | ··· | 250V |
| | 126～150 | 1300V | ··· | 700V | ··· | 300V |
| | · | · | | · | | · |
| | · | · | | · | | · |

IMAGE FORMING APPARATUS OPERABLE IN MODE FOR FORMING TEST CHART USING PLURAL TEST VOLTAGES

FIELD OF THE INVENTION AND RELATED ART

The present invention relates to an image forming apparatus capable of outputting a chart for adjusting a set value of a transfer voltage.

Conventionally, as an image forming apparatus using an electrophotographic type process or the like, there is an image forming apparatus in which a toner image formed on a photosensitive member is primary-transferred onto an intermediary transfer member and thereafter is secondary-transferred from the intermediary transfer member onto a recording material.

Further, there is also an image forming apparatus in which the toner image formed on the photosensitive member is directly transferred onto the recording material. The transfer of the toner image from an image bearing member such as the photosensitive member or the intermediary transfer member to a transfer-receiving member is often performed electrostatically by applying a transfer voltage to a transfer member which contacts the image bearing member to form a transfer portion.

It is important for obtaining a high-quality image product that the transfer voltage when the toner image on the image bearing member is electrostatically transferred onto the recording material is made an appropriate value. In the case where the transfer voltage is not sufficient for a charge amount possessed by toner on the image bearing member, the toner image cannot be sufficiently transferred from the image bearing member onto the recording material and a desired image density cannot be obtained in some instances. This image defect is called "roughening" in some instances. Further, in the case where the transfer voltage is excessively high, electric discharge occurs at a transfer portion and a charge polarity of the toner on the image bearing member is reversed by its electric discharge or the like, so that the toner image on the image bearing member cannot be partially transferred onto the recording material and a resultant image partially causes a white void in some instances. This image defect is called "white void" in some instances.

The charge amount necessary to transfer the toner (image) from the image bearing member onto the recording material fluctuates variously due to a size of the recording material, an area ratio of the toner image, and the like. For that reason, the transfer voltage supplied to the transfer portion is often applied as a constant voltage at which a certain voltage corresponding to a predetermined current density is outputted. In this case, irrespective of a current flowing through an outside of the recording material or through a portion on a recording material on which there is no toner image, a transfer current corresponding to a predetermined voltage can be ensured at an essential portion where the toner image is transferred.

The transfer voltage can be determined on the basis of a transfer portion part voltage corresponding to the electrical resistance of the transfer portion detected in a pre-rotation process before image formation or in the like step, and a recording material part voltage depending on a kind of recording material set in advance. By this, an appropriate transfer voltage can be set according to environment fluctuations, transfer member usage history, the kind of the recording material, and the like. However, depending on the recording material, a preset default recording material part voltage may be higher or lower than the appropriate transfer voltage. Under the circumstances, it is proposed that an operation in an adjustment mode in which a set value of the transfer voltage can be adjusted depending on the recording material actually used in the image formation is performed.

Japanese Laid-Open Patent Application No. 2013-37185 proposes an image forming apparatus operable in an adjustment mode for adjusting the set value of the transfer voltage. In the operation in this adjustment mode, a chart (adjustment chart) on which a plurality of patches (test images) formed on a recording material is formed and outputted while switching the transfer voltage (test voltage) for each patch. This chart is read by a reading device provided in the image forming apparatus and a density of each patch is read. And, depending on a detection result thereof, an optimum transfer voltage condition is selected.

In an operation in a conventional adjustment mode, during formation of a single chart, the transfer voltage (test voltage) is changed stepwise at a certain change width. Conventionally, the change width (herein, also referred to as an "increment" (width)" at one level (stage) of the transfer voltage (test voltage) during formation of this chart) is a fixed value in general.

However, in the market, various recording materials are used, and a high-resistance recording material high in electric resistance and a low-resistance recording material low in electric resistance exist. Further, in the case where a use (operation) environment of the image forming apparatus is a low temperature/low humidity environment, the recording material is dried and has a high resistance, and in the case where the use environment is a high temperature/high humidity environment, the recording material absorbs humidity and has a low resistance. For that reason, in the case of the high-resistance recording material, when the increment (width) of the transfer voltage during formation of the chart is small, there is a possibility that the transfer voltage does not reach an appropriate transfer voltage in a single chart. On the other hand, in the case of the low-resistance recording material, when the increment of the transfer voltage is large, the following possibility arises. That is, due to a rough increment, there is a possibility that the transfer voltage is out of the appropriate transfer voltage capable of compatibly realizing suppression of the image defect ("roughening") caused by an insufficient transfer voltage and suppression of the image defect ("white void") caused by an excessive transfer voltage.

That is, in the case where the increment of the transfer voltage during formation of the chart is constant as in the conventional constitution, it becomes difficult in some instances that the transfer voltage is adjusted to the appropriate transfer voltage because an adjustable range of the transfer voltage becomes narrower than a necessary range and because the increment of the transfer voltage is rough.

Incidentally, a constitution in which a user is capable of manually changing the above-described increment and a constitution in which the above-described increment is changed depending on the kind of the recording material manually set by the user also exist, but it is also difficult in many cases that states of various recording materials are predicted with accuracy and the increment of the transfer voltage during the formation of the chart is appropriately set.

SUMMARY OF THE INVENTION

Therefore, an object of the present invention is to provide an image forming apparatus capable of appropriately adjusting a transfer voltage by simply and appropriately setting a change width of a test voltage at a single level during formation of a chart, depending on a recording material.

The above-described object is accomplished by the image forming apparatus according to the present invention. According to an aspect of the present invention, there is provided an image forming apparatus comprising: an image forming portion configured to form a toner image; an image bearing member configured to bear the toner image formed by the image forming portion; a transfer member configured to form a transfer portion where the toner image is transferred from the image bearing member onto a recording material; an applying portion configured to apply a voltage to the transfer member; a detecting portion configured to detect a voltage value or a current value when the applying portion applies the voltage to the transfer member; and a controller capable of executing an operation in an adjustment mode in which a chart on which a plurality of test images are transferred by stepwise changing a test voltage applied to the transfer member by the applying portion is formed on a recording material and then a transfer voltage applied to the transfer member applied by the applying portion during transfer of the toner image is adjusted, wherein the controller is capable of changing a change width per level of the test voltage applied during formation of the chart, on the basis of a detection result of the detecting portion when the voltage is applied to the transfer member when the recording material on which the chart is formed is in the transfer portion.

Further features of the present invention will become apparent from the following description of exemplary embodiments with reference to the attached drawings.

Figure 6:
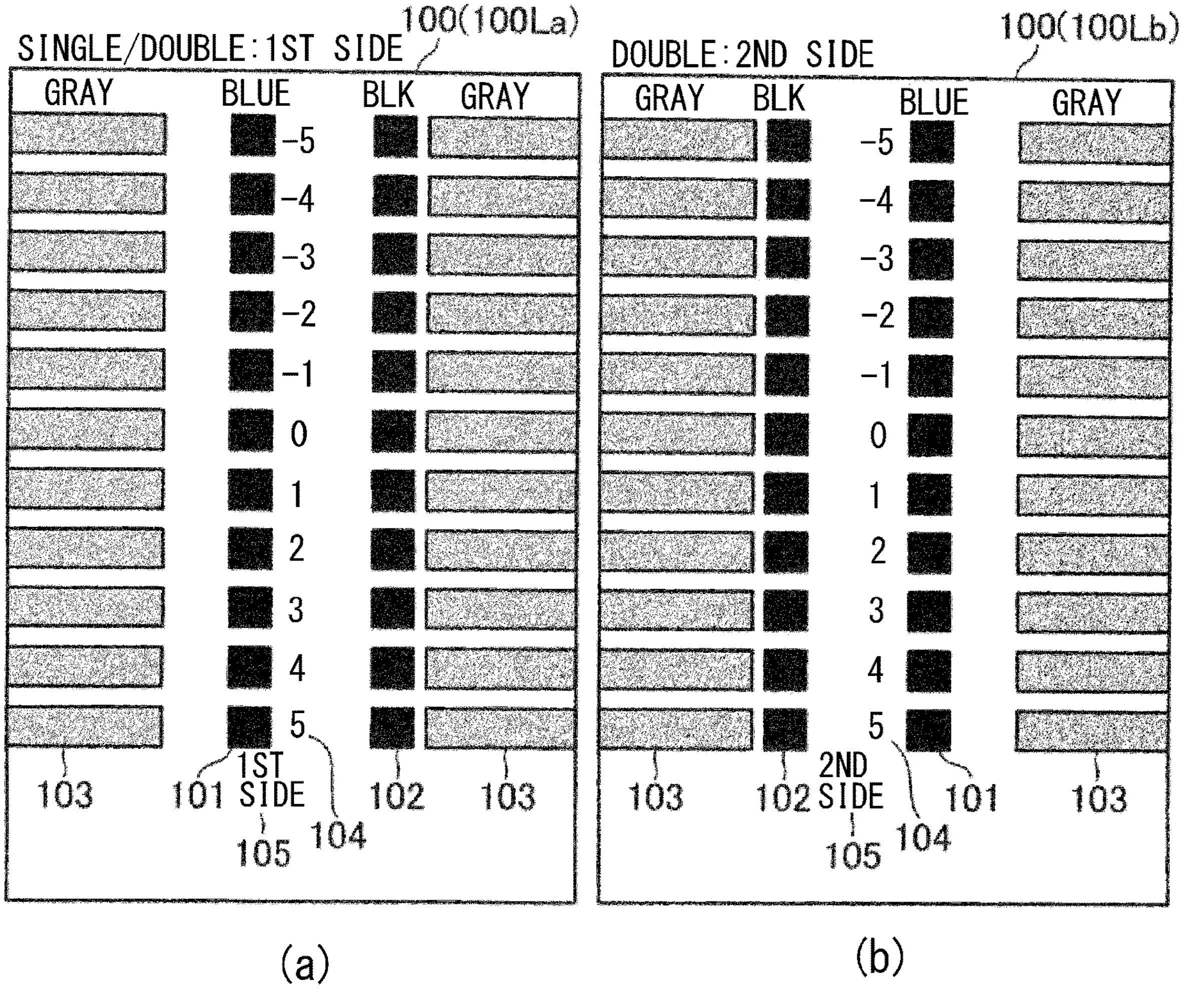

Parts (a) and (b) of FIG. 6 are schematic illustrations of charts each outputted in an operation in an adjustment mode.

Figure 7:
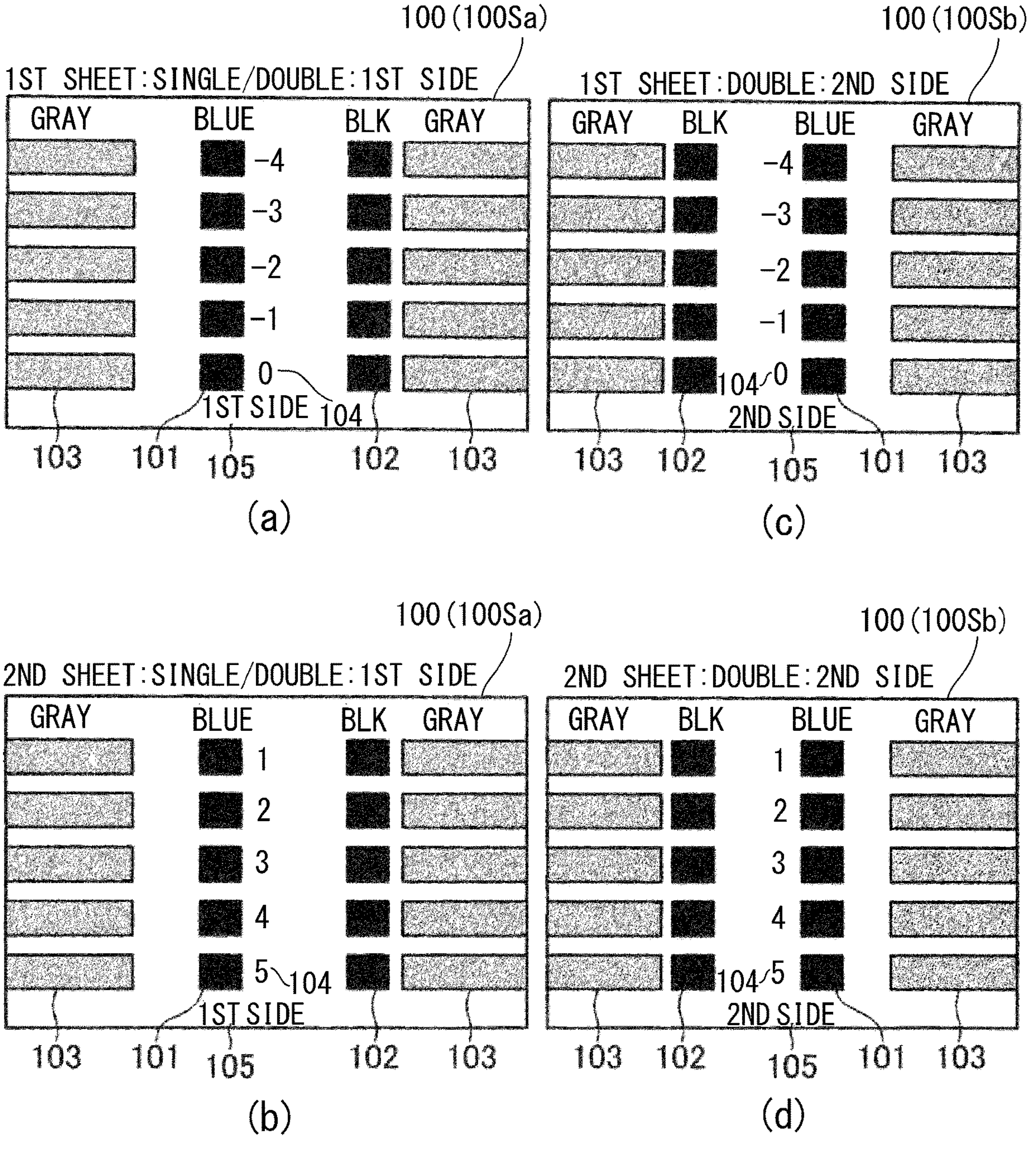

Parts (a) to (d) of FIG. 7 are schematic illustrations of charts each outputted in an operation in an adjustment mode.

Figure 8:
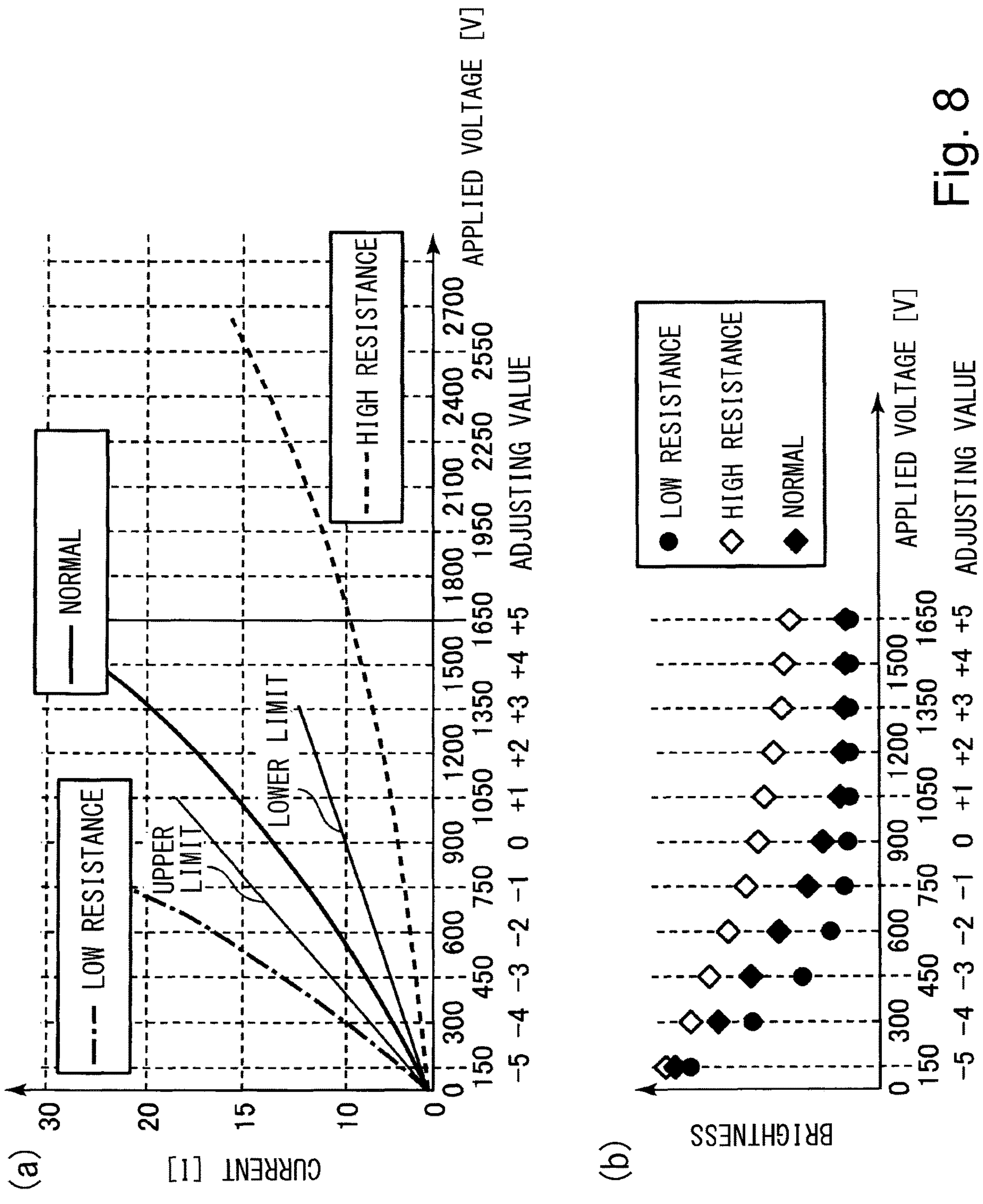

Parts (a) and (b) of FIG. 8 are illustrations of an operation in an adjustment mode in an embodiment 1.

Figure 9:
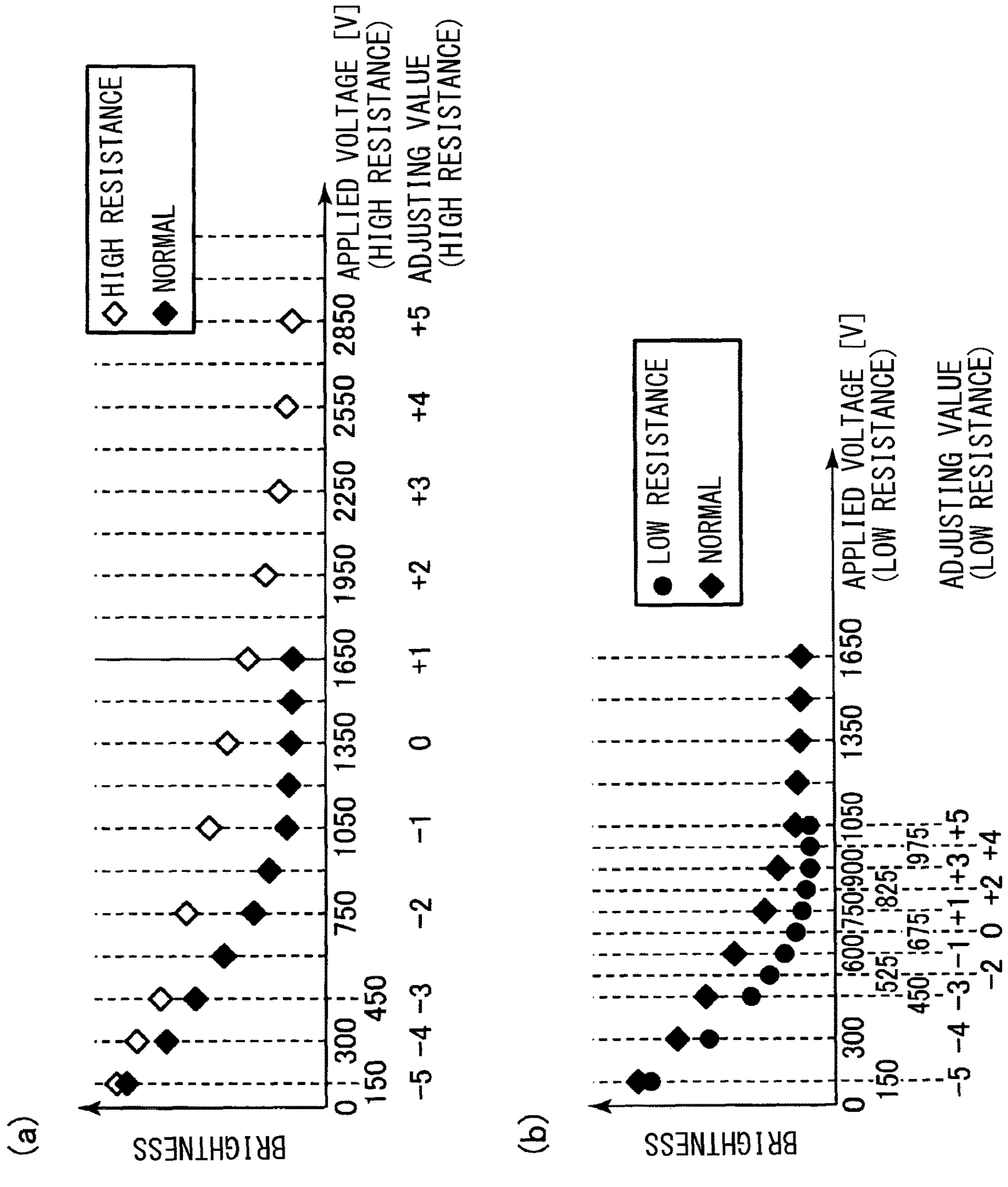

Parts (a) and (b) of FIG. 9 are illustrations of the operation in the adjustment mode in the embodiment 1.

Figure 10:
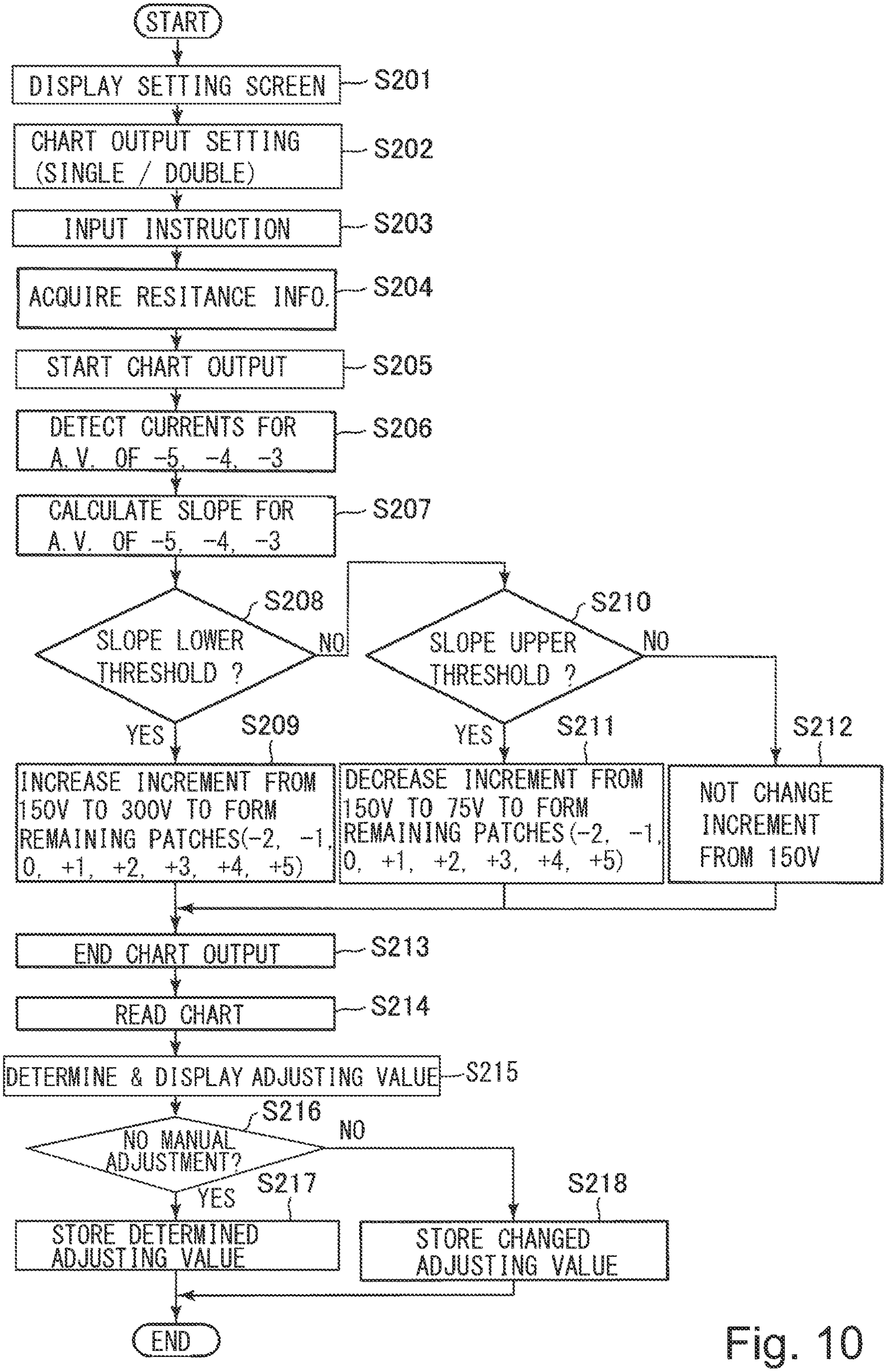

FIG. 10 is a flowchart of the operation in the adjustment mode in the embodiment 1.

Figure 11:
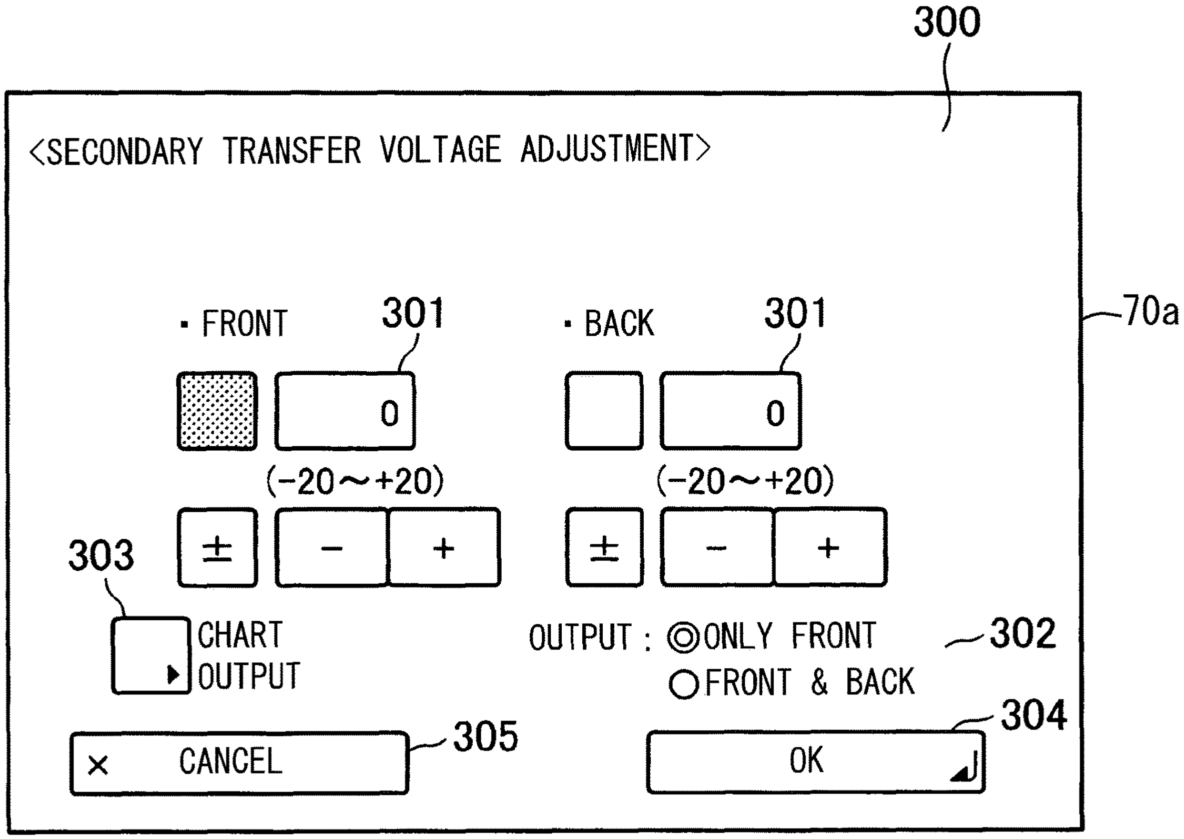

FIG. 11 is a schematic illustration of an adjustment mode setting screen.

Figure 12:
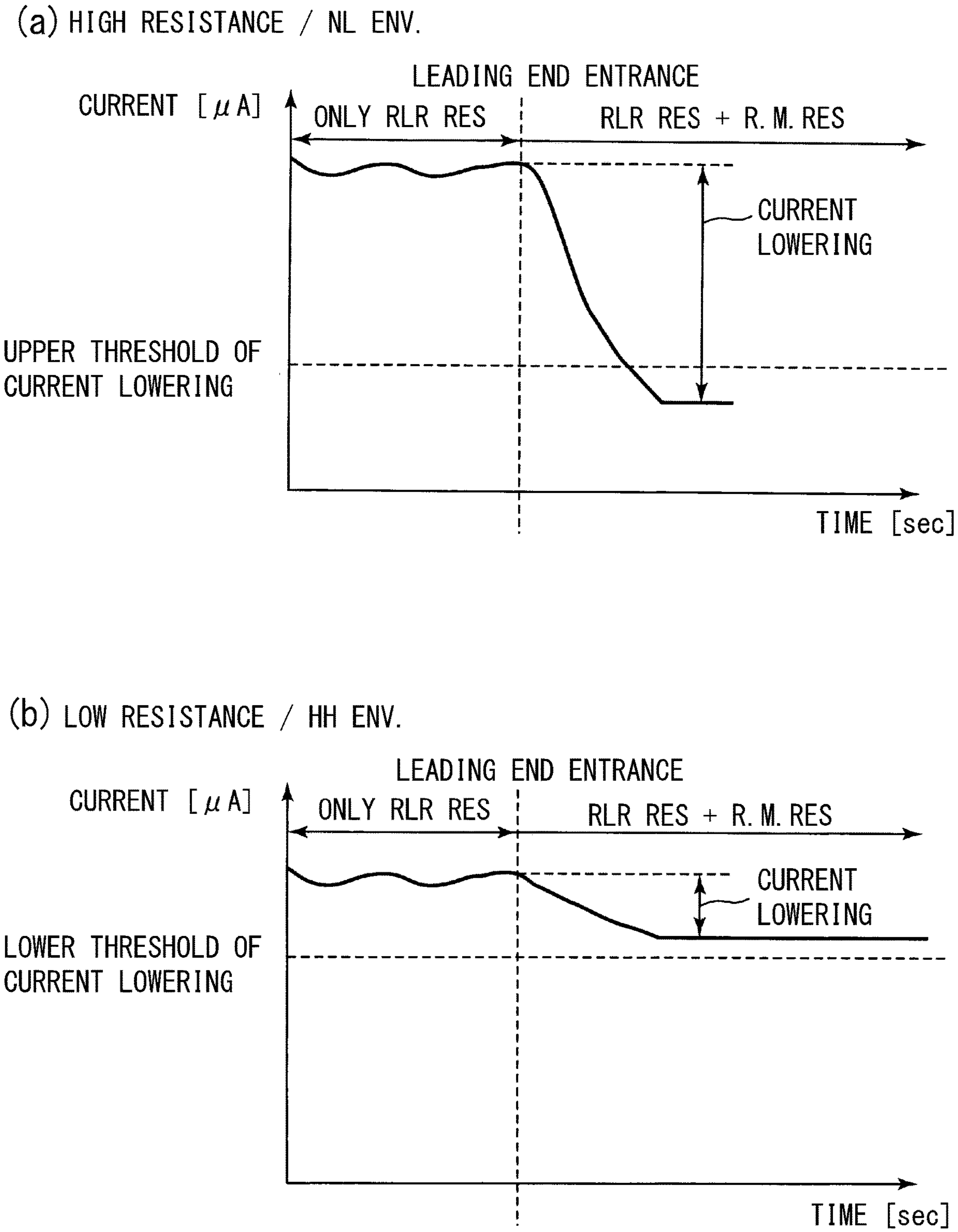

Parts (a) and (b) of FIG. 12 are schematic illustrations each showing an operation in an adjustment mode in an embodiment 2.

Figure 13:
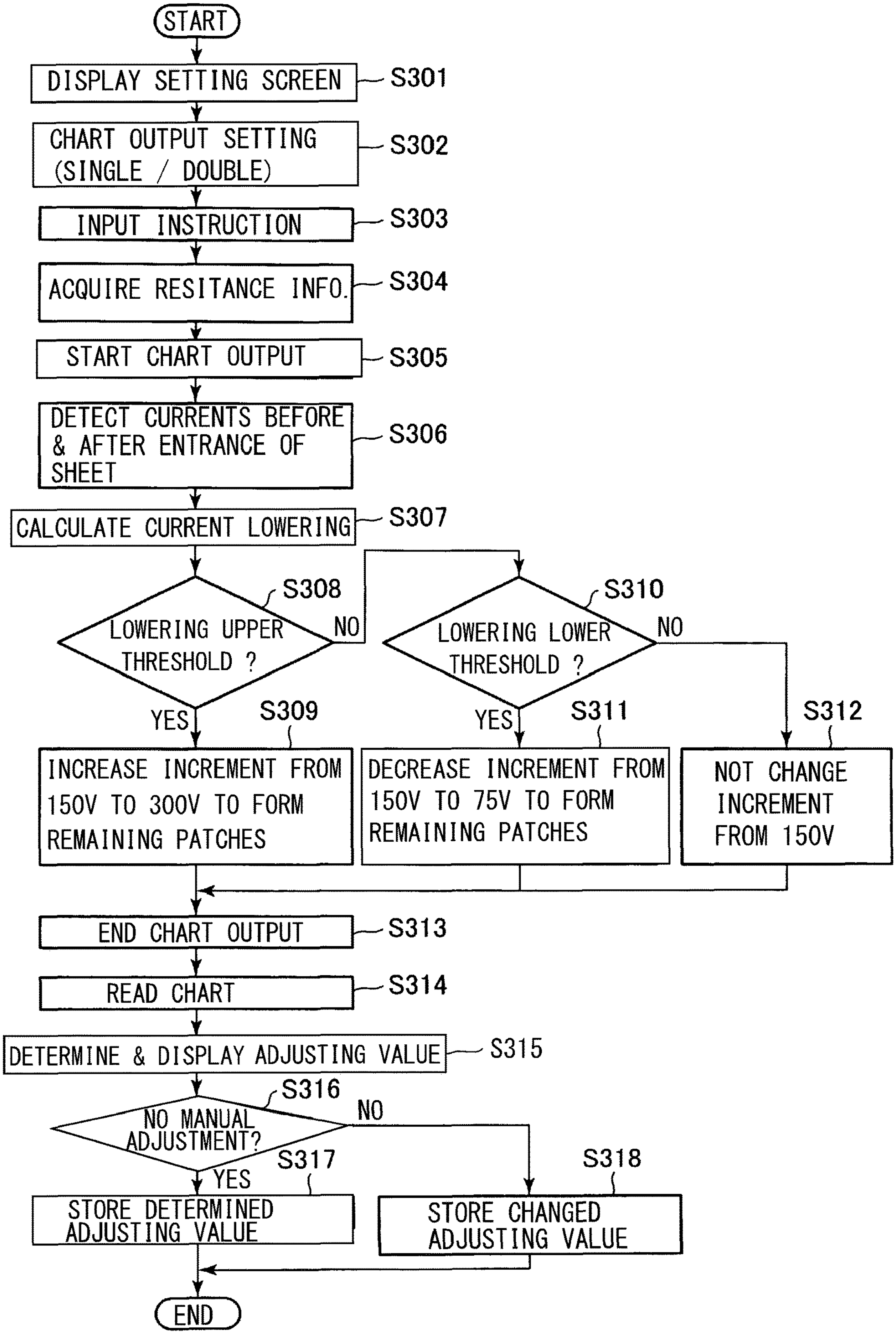

FIG. 13 is a flowchart of the operation in the adjustment mode in the embodiment 2.

Figure 14:
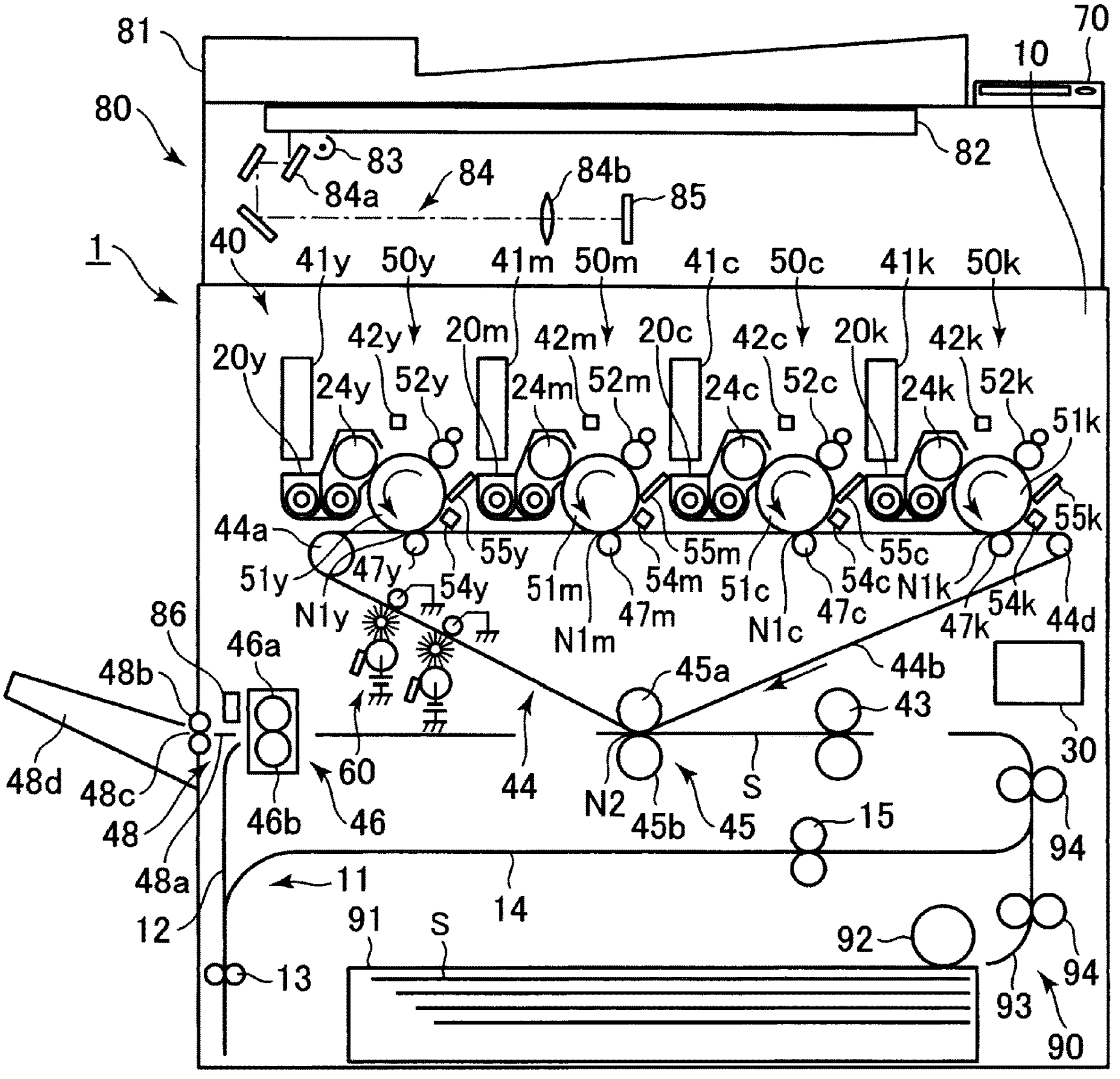

FIG. 14 is a schematic sectional view of an image forming apparatus in another embodiment.

Figure 15:
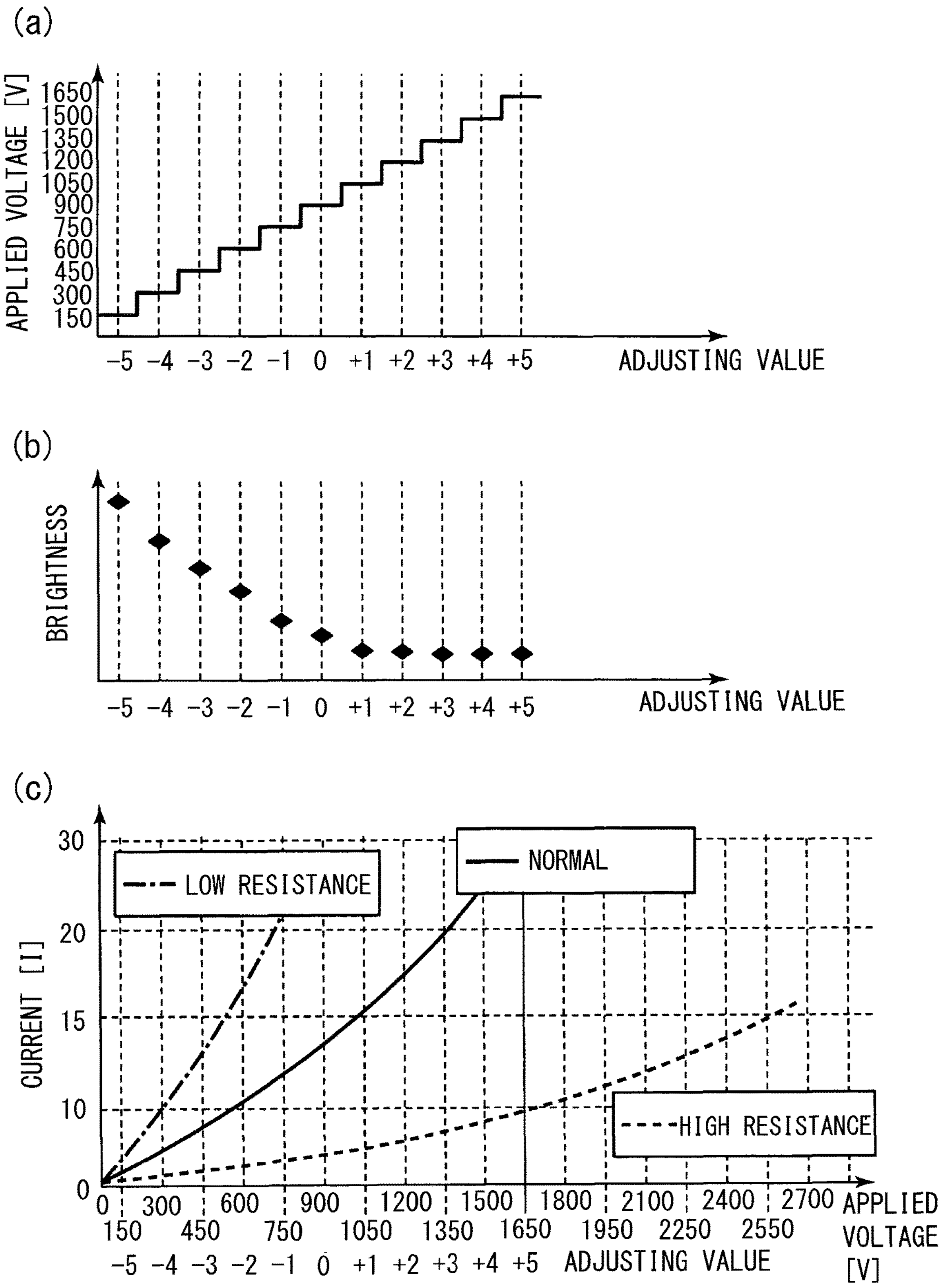

Parts (a), (b) and (c) of FIG. 15 are illustrations of a conventional problem.

DESCRIPTION OF EMBODIMENTS

In the following, the image forming apparatus according to the present invention will be described in more detail with reference to the drawings.

Embodiment 1

1. Structure and Operation of Image Forming Apparatus

Figure 1:
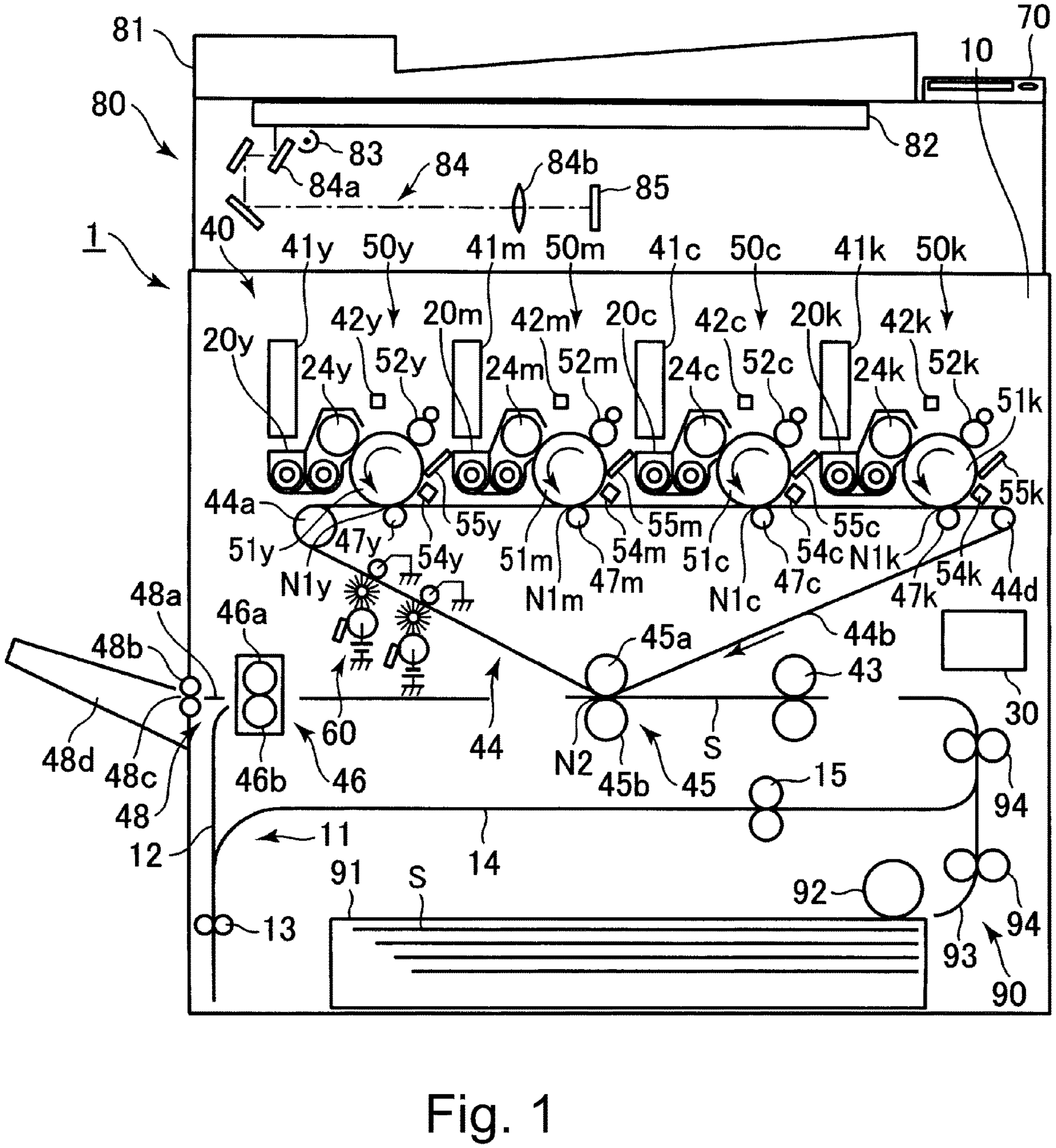
FIG. 1 is a schematic sectional view of an image forming apparatus.

FIG. 1 is a schematic cross-sectional view of an image forming apparatus 1 of this embodiment. The image forming apparatus 1 of this embodiment is a tandem type multi-function machine (having functions of a copying machine, a printer, and a facsimile machine) capable of forming a full-color image by using an electrophotographic type process and employing an intermediary transfer type system.

Figure 2:
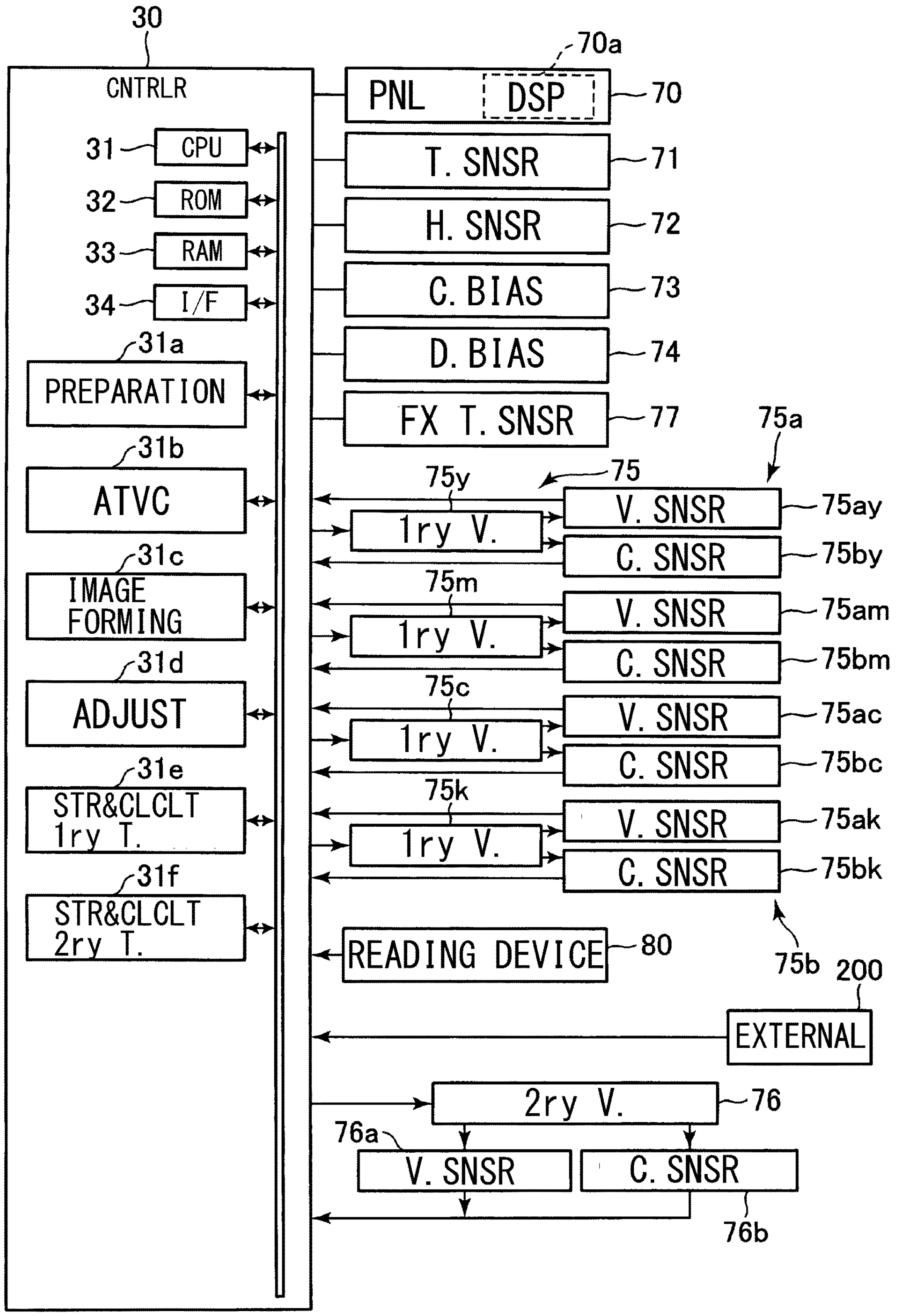
FIG. 2 is a block illustration showing a control system of the image forming apparatus.

As shown in FIG. 1, the image forming apparatus 1 includes an apparatus main assembly 10, a reading device 80, a feeding portion 90, an image forming portion 40, a discharging portion 48, a controller 30, an operation portion 70, and the like. Further, inside the apparatus main assembly 10, a temperature sensor 71 (FIG. 2) capable of detecting a temperature inside the apparatus and a humidity sensor 72 (FIG. 2) capable of detecting a humidity inside the apparatus are provided. The image forming apparatus 1 can form four-color-based full-color image on recording material (sheet, transfer material, is recording medium, media) S, in accordance with image information (image signals) supplied from the reading device 80 or an external device 200 (FIG. 2). As the external device 200, it is possible to cite, for example, a host device, such as a personal computer, or a digital camera or a smartphone. Incidentally, the recording material S is a material on which a toner image is formed, and specific examples thereof include plain paper, synthetic resin sheets which are substitutes for plain paper, thick paper, and overhead projector sheets.

The image forming portion 40 can form the image on the recording material S fed from the feeding portion (detect device 90) on the basis of the image information. The image forming portion 40 includes image forming units 50*y*, 50*m*, 50*c*, 50*k*, toner bottles 41*y*, 41*m*, 41*c*, 41*k*, exposure devices 42*y*, 42*m*, 42*c*, 42*k*, an intermediary transfer unit 44, a secondary transfer device 45, and a fixing portion 46. The image forming units 50*y*, 50*m*, 50*c* and 50*k* form yellow (Y), magenta (M), cyan (C), and black (K) images, respectively. Elements having the same or corresponding functions of structures provided for the respective colors will be collectively described by omitting suffixes y, m, c and k for representing elements for associated colors, respectively, in some instances. Incidentally, the image forming apparatus 1 can also form a single-color image such as a black image or a multi-color image by using the image forming unit 50 for a desired single color or some of the four image forming units 50.

The image forming unit 50 includes the following means. First, a photosensitive drum 51 which is a drum-type (cylindrical) photosensitive member (electrophotographic photosensitive member) as a first image bearing member is provided. In addition, a charging roller 52 which is a roller-type charging member is used as charging means. In addition, a developing device 20 is provided as developing means. In addition, a pre-exposure device 54 is provided as a charge eliminating means. In addition, a drum cleaning device 55 as a photosensitive member cleaning means is provided. The image forming unit 50 forms a toner image on the intermediary transfer belt 44*b* which will be described hereinafter. The image forming unit 50 is integrally assembled into a unit as a process cartridge and can be mounted in and dismounted from the apparatus main assembly 10.

The photosensitive drum 51 is movable (rotatable) while carrying an electrostatic image (electrostatic latent image) or a toner image. In this embodiment, the photosensitive drum 51 is a negatively chargeable organic photosensitive member (OPC) having an outer diameter of 30 mm. The photosensitive drum 51 has an aluminum cylinder as a substrate and a surface layer formed on the surface of the substrate. In this embodiment, the surface layer includes three layers of an undercoat layer, a photocharge generation layer, and a charge transportation layer, which are applied and laminated on the substrate in the order named. As an image forming operation is started, the photosensitive drum 51 is a driven to a rotate in a direction indicated by an arrow (counterclockwise) in the figure at a predetermined process speed (circumferential speed) by a motor (not shown) as a driving means.

The surface of the rotating photosensitive drum 51 is uniformly charged to a predetermined polarity (negative in this embodiment) and a predetermined potential by the charging roller 52. In this embodiment, the charging roller 52 is a rubber roller which contacts the surface of the photosensitive drum 51 and which is rotated by the rotation of the photosensitive drum 51. The charging roller 52 is connected with a charging voltage source 73 (FIG. 2). The charging bias power source 73 applies a predetermined charging voltage (charging bias) to the charging roller 52 during the charging process.

The surface of the charged photosensitive drum 51 is scanned and exposed by the exposure device 42 in accordance with the image information, so that an electrostatic image is formed on the photosensitive drum 51. The exposure device 42 is a laser scanner in this embodiment. The exposure device 42 emits laser beam in accordance with separated color image information outputted from the controller 30, and scans and exposes the surface (outer peripheral surface) of the photosensitive drum 51.

The electrostatic image formed on the photosensitive drum 51 is developed (visualized) by supplying the toner thereto by the developing device 20, so that a toner image is formed on the photosensitive drum 51. In this embodiment, the developing device 20 accommodates, as a developer, a two-component developer comprising non-magnetic toner particles (toner) and magnetic carrier particles (carrier). The toner is supplied from the toner bottle 41 to the developing device 20. The developing device 20 includes a developing sleeve 24. The developing sleeve 24 is made of a nonmagnetic material such as aluminum or nonmagnetic stainless steel (aluminum in this embodiment). Inside the developing sleeve 24, a magnet roller, which is a roller-shaped magnet, is fixed and arranged so as not to rotate relative to a main body (developing container) of the developing device 20. The developing sleeve 24 carries a developer and conveys it to a developing region facing the photosensitive drum 51. A developing voltage source 74 (FIG. 2) is connected to the developing sleeve 24. The developing voltage source 74 applies a predetermined developing voltage (developing bias) to the developing sleeve 24 during a developing step. In this embodiment, on an exposed portion (image portion) of the photosensitive drum 51 lowered in absolute value of the potential by being exposed after being uniformly charged, the toner charged to the same polarity (negative in this embodiment) as the charge polarity of the photosensitive drum 51 is deposited (reverse development). In this embodiment, the normal charge polarity of the toner, which is the charging polarity of the toner during development, is negative.

An intermediary transfer unit 44 is arranged so as to face the four photosensitive drums 51*y*, 51*m*, 51*c* and 51*k*. The intermediary transfer unit 44 includes an intermediary transfer belt 44*b*, which is an intermediary transfer member constituted by an endless belt, as a second image bearing member. The intermediary transfer belt 44*b* is wound around, as a plurality of stretching rollers (supporting rollers), a driving roller 44*a*, a driven roller 44*d*, and an inner secondary transfer roller 45*a*, and is stretched by a predetermined tension. The intermediary transfer belt 44*b* is movable (rotatable) while carrying the toner image. The driving roller 44*a* is rotationally driven by a motor (not shown) as driving means. The driven roller 44*d* is a tension roller which controls the tension of the intermediary transfer belt 44*b* to be constant. The driven roller 44*d* is subjected to a force which pushes the intermediary transfer belt 44*b* from an inner peripheral surface side toward an outer peripheral surface side by an urging force of a tension spring (not shown) which is an urging member as an urging means. By this force, a tension of about 2 to 5 kg is applied in the feeding direction of the intermediary transfer belt 44*b*. The inner secondary transfer roller 45*a* constitutes the secondary transfer device 45 as will be described hereinafter. The driving force is inputted to the intermediary transfer belt 44*b* by rotationally driving the driving roller 44*a*, and the intermediary transfer belt 44*b* is rotated (circulated) in the arrow direction (clockwise direction) in the figure at a predetermined peripheral speed corresponding to the peripheral speed of the photosensitive drum 51. In addition, on the inner peripheral surface side of the intermediary transfer belt 44*b*, the primary transfer rollers 47*y*, 47*m*, 47*c*, 47*k*, which are roller-type primary transfer members as primary transfer means, are disposed correspondingly to the photosensitive drums 51*y*, 51*m*, 51*c*, 51*k*, respectively. The primary transfer roller 47 holds the intermediary transfer belt 44*b* between itself and the photosensitive drum 51. By this, the primary transfer roller 47 contacts the photosensitive drum 51 by way of the intermediary transfer belt 44*b* to form a primary transfer portion (primary transfer nip) N1 where the photosensitive drum 51 and the intermediary transfer belt 44*b* are in contact with each other.

The toner image formed on the photosensitive drum 51 is primarily transferred onto the intermediary transfer belt 44*b* in the primary transfer portion N1. A primary transfer voltage source 75 (FIG. 2) is connected to the primary transfer roller 47. The primary transfer voltage supply 75 applies a primary transfer voltage (primary transfer bias) which is a DC voltage having a polarity opposite to the normal charging polarity of the toner (positive in this embodiment) to the primary transfer roller 47 during a primary transfer step. For example, when forming a full-color image, the yellow, magenta, cyan and black toner images formed on the photosensitive drums 51*y*, 51*m*, 51*c* and 51*k* are primarily transferred so as to be sequentially superimposed on the intermediary transfer belt 44*b*. The primary transfer voltage source 75 is connected to a voltage detecting sensor 75*a* which detects an output voltage and a current detecting sensor 75*b* which detects an output current (FIG. 2). In this embodiment, the primary transfer voltage sources 75*y*, 75*m*, 75*c* and 75*k* are provided for the primary transfer rollers 47*y*, 47*m*, 47*c* and 47*k*, respectively, and the primary transfer voltages applied to the primary transfer rollers 47*y*, 47*m*, 47*c* and 47*k* can be individually controlled.

Here, in this embodiment, the primary transfer roller 47 has an elastic layer of ion conductive foam rubber (NBR rubber) and a core metal. The outer diameter of the primary transfer roller 47 is, for example, 15 to 20 mm. In addition, as the primary transfer roller 47, a roller having an electric resistance value of $1\times10^5$ to $1\times10^8\Omega$ (N/N (23° C., 50 % RH) condition, 2 kV applied) can be preferably used. Further, in this embodiment, the intermediary transfer belt 44*b* is an endless belt having a three-layer structure including a base layer, an elastic layer, and a surface layer in the order named from the inner peripheral surface side toward the outer peripheral surface side. As the resin material constituting the base layer, a resin such as polyimide or polycarbonate, or a material containing an appropriate amount of carbon black as an antistatic agent in various rubbers can be suitably used. The thickness of the base layer is, for example, 0.05 to 0.15 mm. As the elastic material constituting the elastic layer, a material containing an appropriate amount of an ionic conductive agent in various rubbers such as urethane rubber and silicone rubber can be suitably used. The thickness of the elastic layer is 0.1 to 0.500 mm, for example. As a material constituting the surface layer, a resin such as a fluororesin can be suitably used. The surface layer has small adhesive force of the toner to the surface of the intermediary transfer belt 44b and makes it easier to transfer the toner onto the recording material S at a secondary transfer portion N2 (described later). The thickness of the surface layer is, for example, 0.0002 to 0.020 mm. In this embodiment, for the surface layer, one kind of resin material such as polyurethane, polyester, epoxy resin, or two or more kinds of elastic materials such as elastic material rubber, elastomer, butyl rubber, for example, are used as a base material. And, as a material for reducing surface energy and improving lubricity of this base material, powder or particles such as fluororesin, for example, with one kind or two kinds or different particle diameters are dispersed, so that a surface layer is formed. In this embodiment, the intermediary transfer belt 44*b* has a volume resistivity of $5\times10^8$ to $1\times10^{14}\Omega\cdot$cm (23° C., 50 % RH) and a hardness of MD1 hardness of 60 to 85° (23° C., 50 % RH). In this embodiment, the static friction coefficient of the intermediary transfer belt 44*b* is 0.15 to 0.6 (23° C., 50 % RH), (type 94*i* manufactured by HEIDON). Incidentally, in this embodiment, the three-layer structure was employed in the intermediary transfer belt 44*b*, but a single-layer structure of a material corresponding to the material of the above-described base layer may also be employed.

On the outer peripheral surface side of the intermediary transfer belt 44*b*, an outer secondary transfer roller 45*b* which constitutes the secondary transfer device 45 in cooperation with the inner secondary transfer roller 45*a* and which is a roller-type secondary transfer member as a secondary transfer means is disposed. The outer secondary transfer roller 45*b* sandwiches the intermediary transfer belt 44*b* between itself and the inner secondary transfer roller 45*a*. By this, the outer secondary transfer roller 45*b* contacts the inner secondary transfer roller 45*a* by way of the intermediary transfer belt 44*b* and forms a secondary transfer portion (secondary transfer nip) N2 where the intermediary transfer belt 44*b* and the outer secondary transfer roller 45*b* are in contact with each other. The toner image formed on the intermediary transfer belt 44*b* is secondarily transferred onto the recording material S, nipped and fed by the intermediary transfer belt 44*b* and the outer secondary transfer roller 45*b*, in the secondary transfer portion N2.

As described above, in this embodiment, the secondary transfer device 45 includes the inner secondary transfer roller 45*a* as a counter member, and the outer secondary transfer roller 45*b* as a secondary transfer member. The inner secondary transfer roller 45*a* is disposed opposed to the outer secondary transfer roller 45*b* by way of the intermediary transfer belt 44*b*. To the outer secondary transfer roller 45*b*, a secondary transfer voltage source 76 as a voltage applying means (applying portion) (FIG. 2) is connected. During a secondary transfer step, the secondary transfer voltage source 76 applies a secondary transfer voltage (secondary transfer bias) which is a DC voltage having a polarity opposite to the normal charge polarity of the toner (positive in this embodiment) to the outer secondary transfer roller 45*b*. To the secondary transfer voltage source 76, a voltage detecting sensor 76*a* for detecting the output voltage and a current detecting sensor 76*b* for detecting the output current are connected (FIG. 2). Further, in this embodiment, the core metal of the inner secondary transfer roller 45*a* is connected to the ground potential. That is, in this embodiment, the inner secondary transfer roller 45*a* is electrically grounded (connected to the ground). And, when the recording material S is supplied to the secondary transfer portion N2, a secondary transfer voltage with constant-voltage-control having a polarity opposite to the normal charge polarity of the toner is applied to the outer secondary transfer roller 45*b*. In this embodiment, a secondary transfer voltage of 1 to 7 kV is applied, a current of 40 to 120 μA, for example is caused to flow, and the toner image on the intermediary transfer belt 44*b* is secondarily transferred onto the recording material S. Incidentally, in this embodiment, the secondary transfer voltage source 76 applies the DC voltage to the outer secondary transfer roller 45*b*, so that the secondary transfer voltage is applied to the secondary transfer portion N2, but the present invention is not limited to such a constitution. For example, the secondary transfer voltage may also be applied to the secondary transfer portion N2 by applying the DC voltage from the secondary transfer voltage source 76 to the inner secondary transfer roller 45*a*. In this case, to the inner secondary transfer roller 45*a* as the secondary transfer member, the DC voltage of the same polarity as the normal charge polarity of the toner is applied, so that the outer secondary transfer roller 45*b* as the opposing member is electrically grounded. In this embodiment, the outer secondary transfer roller 45*b* includes an elastic layer of ion conductive foam rubber (NBR rubber) and a core metal. The outer diameter of the outer secondary transfer roller 45*b* is, for example, 20 to 25 mm. In addition, as the outer secondary transfer roller 45*b*, a roller having an electric resistance value of $1\times10^5$ to $1\times10^8\Omega$ (measured at N/N (23° C., 50% RH), 2 kV applied) can be preferably used.

The small S is fed from the feeding portion 90 in parallel to the above-described toner image forming operation. That is, the recording material S is stacked and accommodated in a recording material cassette 91 as a recording material accommodating portion. The recording material S accommodated in the recording material cassette 91 is fed toward a feeding passage 93 by a feeding roller 92 or the like as a feeding member. The recording material S fed to the feeding passage 93 is conveyed to a registration roller pair 43 as a feeding member by a conveying roller pair 94 as a conveying member. This recording material S is subjected to correction of oblique movement by the registration roller pair 43, and is timed to the toner image on the intermediary transfer belt 44*b*, and then is supplied toward the secondary transfer portion N2. The feeding portion 90 is constituted by the recording material cassette 91, the feeding roller 92, the feeding passage 93, the conveying roller pair 94, and the like.

The recording material S onto which the toner image has been transferred is fed to a fixing portion (fixing device) 46 as a fixing means. The fixing portion 46 includes a fixing roller 46*a* and a pressing roller 46*b*. The fixing roller 46*a* includes therein a heater as a heating means. The recording material S carrying the unfixed toner image is heated and pressed by being sandwiched and fed between the fixing roller 46*a* and the pressing roller 46*b*. By this, the toner image is fixed (melted and fixed) on the recording material S. Incidentally, the temperature of the fixing roller 46*a* (fixing temperature) is detected by a fixing temperature sensor 77 (FIG. 2).

The recording material S on which the toner image is fixed is fed through a discharge passage 48*a* by a discharging roller pair 48*b* or the like as a feeding member, and is discharged (outputted) through a discharge opening 48*c*, and then is stacked on a discharge tray 48*d* provided outside the apparatus main assembly 10. A discharging portion (discharging device) 48 is constituted by the d is charge passage 48*a*, the discharging roller pair 48*b*, the discharge opening 48*c*, the discharge tray 48*d*, and the like. Further, in this embodiment, the image forming apparatus 1 is capable of forming images on double (both) sides (double side printing, automatic double side printing) in which the images are formed on the double surfaces (sides) on the recording material S. In addition, between the fixing portion 46 and the discharge opening 48, a reverse feeding passage 12 for turning over the recording material S after the toner image is fixed on the first surface and for supplying the recording material S to the secondary transfer portion N2 again is provided. During the double side image formation, the recording material S after the toner image is fixed on the first surface is guided to the reverse feeding passage 12. This recording material S is reversed in feeding direction by a switch-back roller pair 13 device in the reverse feeding passage 12, and is guided to a double side feeding passage 14. Then, this recording material S is sent toward the feeding passage 93 by a re-feeding roller pair 15 provided in the double side feeding passage 14, and is conveyed to the registration roller pair 43, and then the recording material S is supplied toward the secondary transfer portion N2 by the registration roller pair 43. Thereafter, this recording material S is subjected to secondary transfer of the toner image on the second surface thereof similarly as during the image formation of the toner image on the first surface thereof, and after the toner image is fixed on the second surface, the recording material S is discharged to the discharge tray 48*d*. The double side feeding portion (double side feeding device) 11 is constituted by the reverse feeding passage 12, the switch-back roller pair 13, the double side feeding passage 14, there-feeding roller 15, and the like. By actuation of the double side feeding portion 11, it is possible to form the images on double surfaces (sides) of a single recording material S.

The surface of the photosensitive drum 51 after the primary transfer is electrically discharged by the pre-exposure device 54. In addition, a deposited matter such as toner remaining on the photosensitive drum 51 without being transferred onto the intermediary transfer belt 44*b* during the primary transfer step (primary transfer residual toner) is removed from the surface of the photosensitive drum 51 by the drum cleaning device 55 and is collected. The drum cleaning device 55 scrapes off the deposited matter from the surface of the rotating photosensitive drum 51 by a cleaning blade as a cleaning member contacting the surface of the photosensitive drum 51, and accommodates the deposited matter in a cleaning container. The cleaning blade is contacted at a predetermined pressing force to the surface of the photosensitive drum 51 so as to face a counter direction in which the outer end portion of the free end portion faces the upstream side in the rotational direction of the photosensitive drum 51. Further, the intermediary transfer unit 44 includes the belt cleaning device 60 as an intermediary transfer member cleaning means. A deposited matter such as toner remaining on the intermediary transfer belt 44*b* without being transferred onto the recording material S during the secondary transfer step (secondary transfer residual toner) or the like is removed and collected from the surface of the intermediary transfer belt 44*b* by the belt cleaning device 60.

At an upper portion of the apparatus main assembly 10, the reading device 80 as a reading means (reading portion) is disposed. The reading device 80 includes an automatic original feeding device (automatic document feeder (ADF) 81, a platen glass 82, a light source 83, an optical system 84 provided with a mirror group 84*a* and an imaging lens 84*b* and the like, and a reading element 85 such as a CCD. In this embodiment, the reading device 80 is capable of sequentially reading an image of an original (the recording material on which the image is formed) disposed on the platen glass 82 by the reading element 85 by way of the optical system 84 while subjecting the image to scanning exposure to light by a movable optical source 83. In this case, the reading device 80 sequentially illuminates the original disposed on the platen glass 82 with light by the moving optical source 83, and reflected light images from the original are sequentially formed on the reading element 85 by way of the optical system 84. By this, the original image can be read at a dot density determined in advance, by the reading element 85. Further, in this embodiment, the reading device 80 sequentially exposes the original image fed by the automatic original feeding device 81 to light with feeding of the original, so that the reading device 80 is capable of sequentially reading the original image by the reading element 85 by way of the optical system 84. In this case, the reading device 80 sequentially illuminates the original passing through a predetermined reading position on the platen glass 82 with light by the light source 83, so that reflected light images from the original are sequentially formed on the reading element 85 by way of the optical system 84. By this, the original image can be read at the dot density determined in advance, by the reading element 85. Thus, the reading device 85 optically reads the image on the recording material S disposed on the platen glass 82 or fed by the automatic original feeding device 81 and then converts the image into an electric signal.

For example, in the case where the image forming apparatus 1 operates as a copying machine, the image of the original read by the reading device 80 is sent, as image data for three colors of, for example, red (R), green (G), and black (B) (each 8 bits), to an image processing portion of the controller 30. In the image processing portion, the image data of the original is subjected to predetermined image processing as needed, and is converted into image data for four colors of yellow, magenta, cyan and black. As the above-described image processing, it is possible to cite shading correction, positional deviation correction, brightness/color space conversion, gamma correction, frame elimination, color/movement editing, and the like. The image data corresponding to the four colors of yellow, magenta, cyan and black are sequentially sent to the exposure devices 42*y*, 42*m*, 42*c* and 42*k*, respectively, and are subjected to the above-described image exposure depending thereon. Further, as described specifically later, the reading device 80 is also used for reading patches of a chart (acquiring density information (brightness information) in an operation in an adjustment mode.

FIG. 2 is a block diagram showing a schematic constitution of a control system of the image forming apparatus 1 of this embodiment. As shown in FIG. 2, the controller 30 is constituted by a computer. The controller 30 includes, for example, a CPU 31 as a calculating means, a ROM 32 as a storing means for storing a program for controlling each portion, a RAM 33 as a storing means for temporarily storing data, and an input/output circuit (UF) 34 for inputting/outputting signals to and from the outside. The CPU (calculating device) 31 is a microprocessor which controls the entire image forming apparatus 1 and is a main part of the system controller. The CPU 31 is connected to the feeding portion 90, the image forming portion 40, the discharge portion 48, and the operation portion 70 via the input/output circuit 34, and exchanges signals with these portions, and controls the operation of each of these portions. The ROM 32 stores an image formation control sequence for forming the image on the recording material S. The controller 30 is connected to the charging voltage source 73, the developing voltage source 74, the primary transfer voltage source 75, and the secondary transfer voltage source 76, which are controlled by signals from the controller 30, respectively. In addition, the controller 30 is connected to the temperature sensor 71, the humidity sensor 72, the voltage detecting sensor 75*a* and the current detecting sensor 75*b* of the primary transfer voltage source 75, the voltage detecting sensor 76*a* and the current detecting sensor 76*b* of the secondary transfer voltage source 76, and the fixing temperature sensor 77. The signals detected by the respective sensors are inputted to the controller 30.

Then operating portion 70 includes an inputting portion such as an operation button as an input means, and a display portion 70*a* including a liquid crystal panel as display means. Incidentally, in this embodiment, the display unit 70*a* is constituted as a touch panel, and also has a function as the input means. An operator such as a user or a service person can cause the image forming apparatus 1 to execute a job (described later). The controller 30 receives the signal from the operating portion 70 and operates various devices of the image forming apparatus 1. The image forming apparatus 1 can also execute the job on the basis of an image forming signal (image data, control command) supplied from the external device 200 such as the personal computer.

In this embodiment, the controller 30 includes an image formation pre-preparation process portion 31*a*, an ATVC process portion 31*b*, an image formation process portion 31*c*, and an adjustment process portion 31*d*. In addition, the controller 30 includes a primary transfer voltage storage/operation portion 31*e* and a secondary transfer voltage storage/operation portion 31*f*. Here, each of these process portions and storage/operation portions may be provided as a portion or portions of the CPU 31 or the RAM 33. For example, the controller 30 (specifically the image formation process portion 31*c*) can execute a job. In addition, the controller 30 (specifically the ATVC process portion 31*b*) can execute ATVC (setting mode) for the primary transfer portion and the secondary transfer portion. Details of the ATVC will be described hereinafter. In addition, the controller 30 (specifically the adjustment process portion 31*d*) can execute an operation in an adjustment mode for adjusting a set value of the secondary transfer voltage. Details of the operation in the adjustment mode will be described hereinafter.

Incidentally, in this embodiment, the controller 30 (image forming process portion 31*c*) is capable of executing an operation in a plural-color mode in which a plurality of color images are formed by applying a primary transfer voltage to a plurality of primary transfer portions N1 and an operation in a single-color mode in which an image of a single color is formed by applying a primary transfer voltage to only one primary transfer portion N1 of the plurality of primary transfer portions N1.

Here, the image forming apparatus 1 executes the job (image output operation, print job) which is series of operations to form and output an image or images on single or a plurality of recording material S started by one start instruction. The job includes an image forming step, a pre-rotation step, a sheet (paper) interval step in the case where the images are formed on the plurality of recording material S, and a post-rotation step in general. The image forming step is performed in a period in which formation of an electrostatic image for the image actually formed and outputted on the recording material S, formation of the toner image, primary transfer of the toner image and secondary transfer of the toner image are carried out, in general, and during image formation (image forming period) refer to this period. Specifically, timing during the image formation is different among positions where the respective steps of the formation of the electrostatic image, the toner image formation, the primary transfer of the toner image and the secondary transfer of the toner image are performed. The pre-rotation step is performed in a period in which a preparatory operation, before the image forming step, from an input of the start instruction unit the image is started to be actually formed. The sheet interval step is performed in a period corresponding to an interval between a recording material S and a subsequent recording material S when the images are continuously formed on a plurality of recording materials S (continuous image formation). The post-rotation step is performed in a period in which a post-operation (preparatory operation) after the image forming step is performed. During non-image formation (non-image formation period) is a period other than the period of the image formation (during image formation) and includes the periods of the pre-rotation step, the sheet interval step, the post-rotation step and further includes a period of a pre-multi-rotation step which is a preparatory operation during turning-on of a main switch (voltage source) of the image forming apparatus 1 or during restoration from a sleep state.

2. Control of Secondary Transfer Voltage

Figure 3:
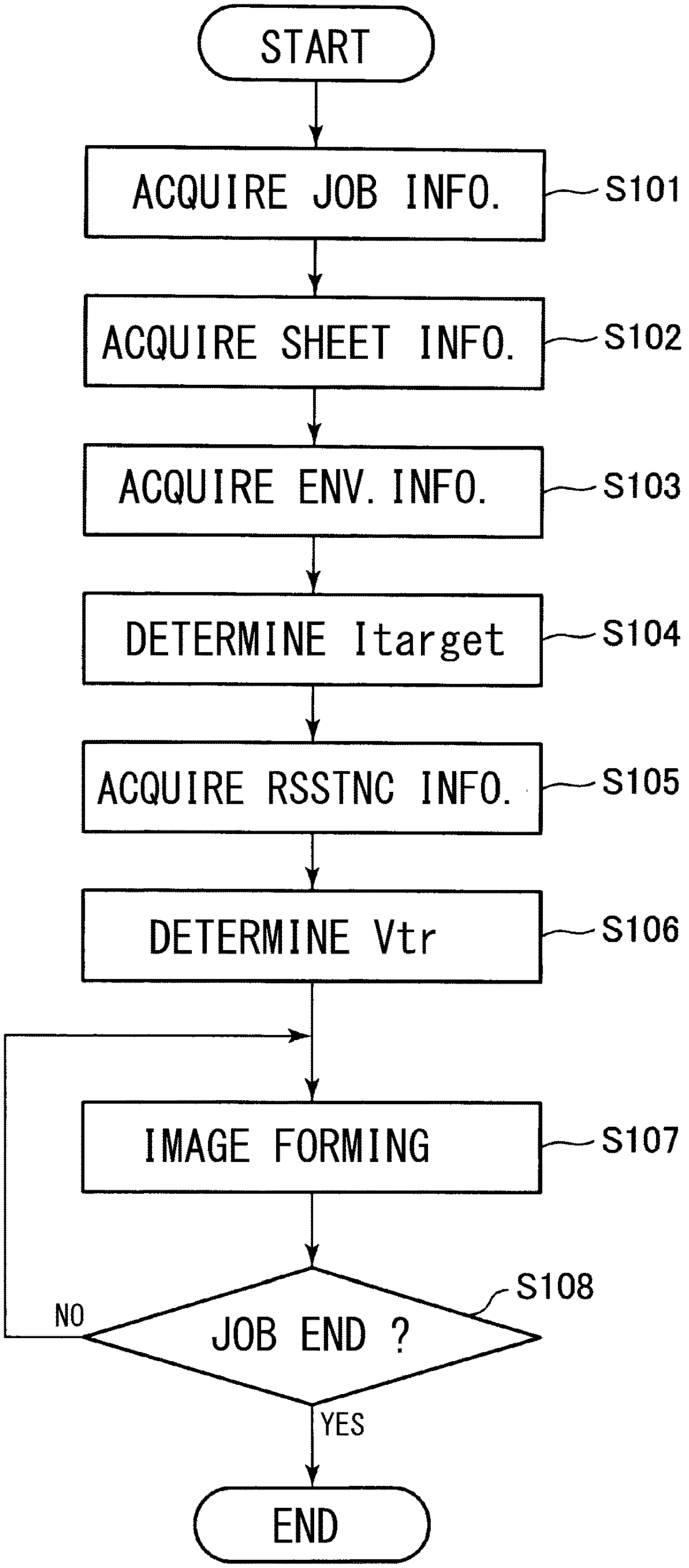
FIG. 3 is a flowchart showing an outline of a procedure of control of a secondary transfer voltage.

Next, control of the secondary transfer voltage will be described. FIG. 3 is a flow chart showing an outline of a procedure relating to the control of the secondary transfer voltage in this embodiment. Generally, the control of the secondary transfer voltage includes constant-voltage control and constant-current control, and in this embodiment, the constant-voltage control is used.

First, the controller 30 (image formation pre-preparation process portion 31*a*) causes the image forming portion to start an operation of a job when it acquires information on the job from the operation portion 70 or the external device 200 (S101). In the information on this job, image information designated by an operator and information on the recording material S are included. The information on the recording material S may include a size (width, length) of the recording material S on which the image is to be formed, information (thickness, basis weight and the like) relating to the thickness of the recording material S, and information relating to a surface property of the recording material S such that whether or not the recording material S is coated paper. Particularly, in this embodiment, the information on the recording material S includes information on the size of the recording material S and information on a category (so-called category of paper kind) of the recording material S such as "thin paper, plain paper, thick paper, . . . " relating to the thickness of the recording material S. Incidentally, the information relating to the recording material S (recording material information) includes any distinguishable pieces of information on the recording material S, such as attributes (so-called the paper kind category) based on general characteristics including plain paper, high-quality paper, glossy paper (gloss paper), coated paper, embossed paper, thick paper, and thin paper; numerical value or numerical value ranges such as a basis weight, a thickness, a size, and rigidity; or brands (including manufacturers, trade names, model names, and the like). It can be understood that the kind of the recording material S is constituted for each of the recording materials S distinguished by the information relating to the recording material S. Further, the information relating to the recording material S may be included in information on a print mode for designating operation setting of the image forming apparatus 1, such as "plain paper mode" or "thick paper mode" or may also be substituted by the information relating to the print mode. The controller 30 (image formation pre-preparation process portion 31*a*) writes this job information in the RAM 33 (S102).

Next, the controller 30 (image formation pre-preparation process portion 31*a*) acquires environment information detected by the temperature sensor 71 and the humidity sensor 72 (S103). In the ROM 32, information showing correlation between the environment information and a target current Itarget for transferring the toner image from the intermediary transfer belt 44*b* onto the recording material S is stored. The controller 30 (secondary transfer voltage storage/operation portion 31*f*) acquires the target current Itarget corresponding to the environment from the information showing the correlation between the environment information and the target current Itarget, on the basis of the environment information read in S103. Then, the controller 30 writes this target current Itarget in the RAM 33 (or the secondary transfer voltage storage/operation portion 31*f*) (S104). Incidentally, why the target current Itarget is changed depending on the environment information is that the toner charge amount varies depending on the environment. The information showing the correlation between the environment information and the target current Itarget has been acquired in advance by an experiment or the like.

Figures 4, 5:
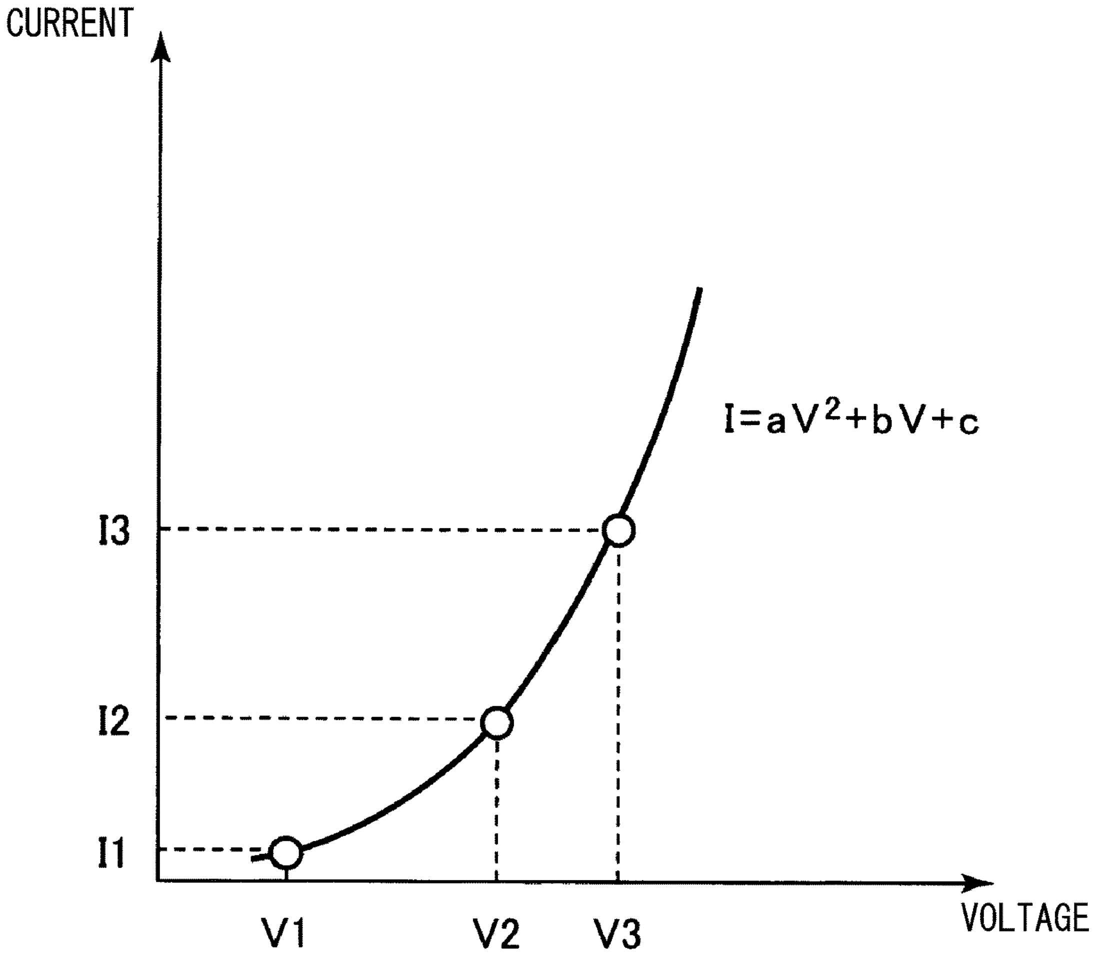
FIG. 4 is a graph showing a voltage-current characteristic acquired in the control of the secondary transfer voltage.
FIG. 5 is a schematic illustration showing an example of table data of a recording material part voltage.

Next, the controller 30 (ATVC process portion 31*b*) acquires information on an electric resistance of the secondary transfer portion N2 by the ATVC (active transfer voltage control) before the toner image on the intermediary transfer belt 44*b* and the recording material S onto which the toner image is transferred reach the secondary transfer portion N2 (S105). That is, in a state in which the outer secondary transfer roller 45*b* and the intermediary transfer belt 44*b* are contacted to each other, predetermined voltages of a plurality of levels are applied (supplied) from the secondary transfer voltage source 76 to the outer secondary transfer roller 45*b*. Then, current values when the predetermined voltages are applied are detected by the current detecting sensor 76*b*, so that a relationship between the voltage and the current (voltage-current characteristic) as shown in FIG. 4 is acquired. The controller 30 writes information on this relationship between the voltage and the current in the RAM 33 (or the secondary transfer voltage storage/operation portion 31*f*). This relationship between the voltage and the current changes depending on the electric resistance of the secondary transfer portion N2. In the constitution of this embodiment, the relationship between the voltage and the current is not such that the current changes linearly relative to the voltage (i.e., is linearly proportional to the voltage), but is such that the current changes so as to be represented by a polynomial expression consisting of two or more terms of the voltage (quadratic expression in this embodiment). For that reason, in this embodiment, in order that the relationship between the voltages and the current can be represented by the polynomial expression, the number of predetermined voltages or currents supplied when the information on the electric resistance of the secondary transfer portion N is acquired is three or more (levels).

Then, the controller 30 (secondary transfer voltage storage/operation portion 31*f*) acquires a voltage value to be applied from the secondary transfer voltage source 76 to the outer secondary transfer roller 45*b* (S106). That is, on the basis of the target current Itarget written in the RAM 33 in S104 and the relationship between the voltage and the current acquired in S105, the controller 30 acquires a voltage value Vb necessary to cause the target current Itarget to flow in a state in which the recording material S is absent in the secondary transfer portion N2. This voltage value Vb corresponds to a secondary transfer portion part voltage (transfer voltage corresponding to the electric resistance of the secondary transfer portion N2). Incidentally, a constitution in which the target current Itarget is applied from the secondary transfer voltage source 76 to the outer secondary transfer roller 45*b* by constant-current control and a voltage value at that time is detected by the voltage detecting sensor 76*a* and in which a detected voltage is set at a voltage value Vb can also be employed. Further, in the ROM 32, information for acquiring a recording material part voltage (transfer voltage corresponding to the electric resistance of the recording material S) Vp as shown in FIG. 5 is stored. In this embodiment, this information is set as table data indicating a relationship between water content and the recording material part voltage Vp in an ambient atmosphere for each of sections (corresponding to paper kind categories) of basis weights of recording material S. Incidentally, the controller 30 (image formation pre-preparation process portion 31) is capable of acquiring ambient water content on the basis of environment information (temperature, humidity) detected by the temperature sensor 71 and the humidity sensor 72. On the basis of the information on the job acquired in S101 and the environment information acquired in S103, the controller 30 (secondary transfer voltage storage/operation portion 31*f*) acquires the recording material part voltage Vp from the above-described table data. Further, in the case where the adjusting value is set by the operation in the adjustment mode (described later) for adjusting the set value of the secondary transfer voltage, the controller 30 (secondary transfer voltage storage/operation portion 31*f*) acquires an adjusting amount (correction amount) ΔV depending on the adjusting value (corrected value). As described later, this adjusting amount ΔV is stored in the RAM 33 (or the secondary transfer voltage storage/operation portion 31*f*) in the case where the adjusting value is set by the operation in the adjustment mode. The controller 30 acquires Vb+Vp+ΔV which is the sum of the above-described voltage values Vb, Vp and ΔV, as a secondary transfer voltage Vtr applied from the secondary transfer voltage source 76 to the outer secondary transfer roller 45*b* when the recording material S passes through the secondary transfer portion N2. Then, the controller 30 writes this Vtr (=Vb+Vp+ΔV) in the RAM 33 (or the secondary transfer voltage storage/operation portion 31*f*). Incidentally, the table data for acquiring the recording material part voltage Vp as shown in FIG. 5 are acquired in advance by an experiment or the like.

Here, the recording material part voltage Vp also changes depending on a surface property of the recording material S other than the information (thickness, basis weight or the like) relating to the thickness of the recording material S in some instances. For that reason, the table data may also be set so that the recording material part voltage Vp changes also depending on the information relating to the surface property of the recording material S. Further, in this embodiment, the information relating to the thickness of the recording material S (and in addition, the information relating to the surface property of the recording material S) are included in the job information acquired in S101. However, a measuring means for detecting the thickness of the recording material S and the surface property of the recording material S is provided in the image forming apparatus 1, and the recording material part voltage Vp may also be acquired on the basis of information acquired by this measuring means.

Next, the controller 30 (the image formation process portion 31*c*) causes the image forming portion to form the image and to send the recording material S to the secondary transfer portion N2 and causes the secondary transfer device to perform the secondary transfer by applying the secondary transfer voltage Vtr determined as described above (S107). Thereafter, the controller 30 (the image formation process portion 31*c*) repeats the processing of S107 until all the images in the job are transferred and completely outputted on the recording material S (S108).

Incidentally, also as regards the primary transfer portion N1, the ATVC similar to the above-described ATVC is carried out in a period from a start of the job until the toner image is fed to the primary transfer portion N1, but detailed description thereof will be omitted in this embodiment.

3. Outline of Adjustment Mode

Next, an operation in an adjustment mode (simple adjustment mode) for adjusting the set value of the secondary transfer voltage will be described.

Depending on the kind (type) and condition of the recording material S used in image formation, the water (moisture) content and electrical resistance value of the recording material S differ greatly from those of the standard recording material S in some instances. In this case, optimal transfer cannot be performed in some instances at the set value of the secondary transfer voltage using a default recording material part voltage Vp set in advance as described above. That is, first, the secondary transfer voltage needs to be a voltage necessary for transferring the toner from the intermediary transfer belt 44*b* to the recording material S. In addition, the secondary transfer voltage must be suppressed to a voltage at which the abnormal discharge does not occur. However, depending on the kind and state of the recording material S actually used for image formation, the electrical resistance is higher than the value assumed as a standard value in some instances. In such a case, the voltage required to transfer the toner from the intermediary transfer belt 44*b* to the recording material S is insufficient at the set value of the secondary transfer voltage using the preset default recording material part voltage Vp in some instances. Therefore, in this case, it is desired to increase the secondary transfer voltage by increasing the recording material part voltage Vp or the like. On the contrary, depending on the kind and condition of the recording material S actually used for image formation, the recording material S absorbs moisture or the like, with the result that the electrical resistance is lower than the value assumed as a standard value, and the electrical discharge is liable to occur in some instances. In this case, at the set value of the secondary transfer voltage using the preset default recording material part voltage Vp, image defects due to the abnormal discharge occur in some instances. Therefore, in this case, it is desirable to lower the secondary transfer voltage by reducing the recording material part voltage Vp or the like.

Therefore, it is desired in some instances that the operator such as a user or a service person adjusts (changes) the recording material part voltage Vp depending on the recording material S actually used for image formation and thus adjusts (changes) the set value of the secondary transfer voltage during the execution of the job to an appropriate value. That is, it is desired in some instances that an appropriate recording material part voltage Vp+Vb (adjusting amount) depending on the recording material S actually used for image formation is selected. It would be considered that this adjustment is performed by the following method. That is, for example, the operator outputs the images intended to be outputted while switching the secondary transfer voltage for each recording material S, and confirms the output image and determines the set value of the secondary transfer voltage (specifically the recording material part voltage Vp+ΔV). However, in this method, since the outputting operation of the image and the adjustment of the set value of the secondary transfer voltage are repeated, the recording material S which is wasted increases, and it takes time to adjust the set value in some instances.

Therefore, in this embodiment, the image forming apparatus 1 is made operable in the adjustment mode in which the set value of the secondary transfer voltage is adjusted. In this operation in the adjustment mode, a chat on which a plurality of representative color patches (test image) are transferred while the set value of the secondary transfer voltage (test voltage) is switched for each patch is formed and outputted. And, the appropriate set value of the secondary transfer voltage (more specifically, the recording material part voltage Vp+ΔV) can be determined on the basis of the outputted chart. In this embodiment, in the operation in the adjustment mode, on the basis of a result, read by the reading device 80, of density information (brightness information) of a patch (typically, solid image patch) on the chart, the controller 30 presents information relating to a recommended adjusting amount ΔV of the set value of the secondary transfer voltage. By this, necessity that the operator confirms the image on the chart by eye observation or the like is reduced, so that it becomes possible to more appropriately adjust the set value of the secondary transfer voltage while alleviating an operation load of the operator.

4. Chart

Next, the chart (image for adjustment, test page) outputted in the operation in the adjustment mode in this embodiment will be described. Parts (a) and (b) of FIG. 6 and parts (a) to (d) of FIG. 7 are schematic illustrations each showing a chart 100 in this embodiment.

In this embodiment, in the operation in the adjustment mode, depending on a size of the recording material S used, roughly, two kinds of charts 100 shown in FIG. 6 and FIG. 7, respectively, are outputted. Each of parts (a) and (b) of FIG. 6 shows the chart 100 outputted in the case where a length of the recording material S with respect to a recording material feeding direction is 420 mm-487 mm. Each of parts (a) to (d) of FIG. 7 shows the chart 100 outputted in the case where the length of the recording material S with respect to the recording material feeding direction is 210 mm-419 mm. Incidentally, in this embodiment, the chart can be made output table on double surfaces (sides) so that the secondary transfer voltage during the secondary transfer onto each of a front surface (first surface) and a back surface (second surface) in double side image formation can be adjusted. In each of FIG. 6 and FIG. 7, the chart in the case where the chart is formed on one side of the recording material S (hereinafter, this chart is referred to as a "one side chart") and the chart in the case where the chart is formed on double sides of the recording material S (hereinafter, this chart is referred to as a "double side chart") are shown. The double side chart is formed by the double side image formation using the above-described double side feeding portion 11.

Here, the size of the recording material S is represented by (recording material width (length with respect to a main scan direction))×(recording material length with respect to a sub-scan direction)). The recording material width is a length of the recording material S with respect to a direction (widthwise direction) substantially perpendicular to the recording material feeding direction when the recording material S passes through the secondary transfer portion N2. The recording material length is a length of the recording material S with respect to a direction substantially parallel to the recording material feeding direction when the recording material S passes through the secondary transfer portion N2.

Each of parts (a) and (b) of FIG. 6 shows a chart for a large size (hereinafter, referred to as a "large chart") 100L (100La, 100Lb) outputted in the case where a recording material S of a large size such as A3 size (297 mm×420 mm) or ledger size (about 280 mm×about 432 mm) is used. Part (a) shows a large chart 100La in the case where the one side chart is outputted (or on the first surface in the case where the double side chart is outputted). Further, part (b) of FIG. 6 shows a large chart 100Lb on the second surface in the case where the double side is outputted.

Each of parts (a) to (d) of FIG. 7 shows a chart for a small size (hereinafter, referred to as a "small chart") 100S (100Sa, 100Sb) outputted in the case where a recording material S of a small size such as A4 landscape size (297 mm×210 mm) or letter landscape size (about 280 mm×about 216 mm) is used. Parts (a) and (b) of FIG. 7 show a small chart 100Sa on a first sheet and a small chart 100Sa on a second sheet, respectively, in the case where the one side chart is outputted (or on the first surface in the case where the double side chart is outputted). Parts (c) and (d) of FIG. 7 show a small chart 100Sa on a first sheet and a small chart 100Sb on a second sheet, respectively, on the second surface in the case where the double side chart is outputted.

When confirmation of the outputted chart through eye observation by the operator is taken into consideration, the lager the patch size of the chart that is outputted in the operation in the adjustment mode, the more advantageous is since then it is easier to check for image defects. However, if the patch is large, the number of patches which can be formed on one recording material S is reduced. The patch shape can be square and so on. The color of the patch can be determined by the image defect to be checked and by the easiness of checking. For example, when the secondary transfer voltage is increased from a low value, the lower limit of the secondary transfer voltage can be determined from the voltage value at which the secondary color patches such as red, green, and blue can be properly transferred. In addition, in the case where the operator confirms the outputted chart by eye observation, when the secondary transfer voltage is further increased, the upper limit value of the secondary transfer voltage can be determined from the voltage value at which image failure (defect) occurs due to the high secondary transfer voltage in the halftone patch.

The chart 100 includes a patch set in which one blue solid patch 101, one black solid patch 102, and two halftone patches 103 are arranged in the widthwise direction. And, in the large chart 100L of FIG. 6, eleven sets of patch sets 101 to 103 in the widthwise direction are arranged in the feeding direction. Further, in the small chart 100S of FIG. 7, ten sets of the patch sets 101 to 103 in the widthwise direction are arranged in the feeding direction. Incidentally, in this embodiment, the halftone patches 103 are gray (black halftone) patches. Here, the solid image is an image with a maximum density level. In this embodiment, the blue solid image is a superposed image of images of magenta (M) toner=100% and cyan (C) toner=100% and is 200% in toner application amount. Further, the halftone image is, for example, an image with a toner application amount of 10-80% when the toner application amount of the solid image is 100%. In addition, in this embodiment, the chart 100 includes patch identification information 104 for identifying the setting of the secondary transfer voltage applied to each patch set in association with each of 11 patch sets 101 to 103. This identification information 104 may be a value corresponding to an adjusting (adjustment) value of the secondary transfer voltage (described later). In the large chart 100L of FIG. 6, eleven pieces of the patch identification information 104 (11 pieces of −5 to 0 to +5 in this embodiment) corresponding to eleven steps (levels) of secondary transfer voltage settings are provided. In the small chart 100S of FIG. 7, ten pieces of the patch identification information 104 (5 pieces of −4 to 0 on the first sheet and 5 pieces of +1 to +5 on the second sheet in this embodiment) corresponding to ten steps (levels) of the secondary transfer voltage settings are provided.

Further, the chart 100 may be provided with front/back identification information 105 indicating at least one of the front surface (first surface) and the back surface (second surface) of the recording material S on at least one of the front surface (first surface) and the back surface (second surface) of the recording material S.

The size of the patch is required to be large enough to permit the operator to easily discriminate whether there is an image defect or not. For the transferability of the blue solid patch 101 and the black solid patch 102, if the size of the patch is small, it can be difficult to discriminate the defect, and therefore, the size of the patch is preferably 10 mm square or more, and when the size of the patch is 25 mm square or more, it is further preferable.

The image defects due to electric discharge which occur when the secondary transfer voltage is increased in the halftone patch 103 are often in the form of white spots. This image defect tends to be easy to discriminate even in a small size image, compared to the transferability of the solid image. However, it is easier to observe the image defect if the image is not too small, and therefore, in this embodiment, the width of the halftone patch 103 in the feeding direction is the same as the width of the blue solid patch 101 and the black solid patch 102 in the feeding direction. In addition, the interval between the patch sets 101 to 103 in the feeding direction may only be required to be set so that the secondary transfer voltage can be switched. In this embodiment, each of the blue solid patch 101 and the black solid patch 102 is a square (one side of which is substantially parallel to the widthwise direction) of 25.7 mm×25.7 mm. Further, in this embodiment, each of the halftone patches 103 at opposite end portions with respect to the width direction is 25.7 mm in width with respect to the width direction, and the widthwise direction thereof extends to an extreme end portion (which may include a margin described later). Further, in this embodiment, the interval between the patch sets 101 to 103 in the feeding direction is 9.5 mm. The secondary transfer voltage is switched at a timing when a portion on the chart 100 corresponding to this interval passes through the secondary transfer portion N2. In this embodiment, the patch sets 101 to 103 are sequentially transferred from an upstream side to a downstream side of the feeding direction of the recording material S during formation of the chart 100 by using a plurality of secondary transfer voltages made different so as to sequentially increase in absolute value. However, the present invention is not limited thereto. The patch sets 101 to 103 may also be sequentially transferred from the upstream side to the downstream side of the recording material feeding direction during the formation of the chart 100 by using the plurality of secondary transfer voltages made different so as to sequentially decrease in absolute value. The secondary transfer voltages during the formation of the chart 100 will be specifically described later.

Incidentally, it is preferable to prevent patches from being formed in the neighborhood of the leading and trailing ends of the recording material S in the recording material feeding direction (for example, in the range of about 20 to 30 mm inward from the edge). The reason for this will be described. That is, of the end portions in the feeding direction of the recording material S, there may be an image defect that occurs only at the leading end or the trailing end. This is because in this case, it may be difficult to determine whether or not an image defect has occurred because the secondary transfer voltage is changed.

A size of a maximum recording material S usable in the image forming apparatus 1 of this embodiment is 13 inches (about 330 mm)×19.2 inches (about 487 mm), and the large chart 100L of FIG. 6 corresponds to the recording material S of this size. In the case where the size of the recording material S is 13 inches×19.2 inches or less and the A3 size (297 mm×420 mm) or more, a chart corresponding to image data cut out of the image data of the large chart 100L of FIG. 6 depending on the size of the recording material S is outputted. At this time, in this embodiment, the image data is cut out in conformity to the size of the recording material S on a leading end center (line) basis. That is, the image data is cut out in a manner such that the leading end of the recording material S with respect to the feeding direction and the leading end (upper end in the figure) of the large chart 100L are aligned with each other and that a center (line) of the recording material S with respect to the widthwise direction and a center (line) of the large chart 100L with respect to the widthwise direction are aligned with each other. Further, in this embodiment, the image data is cut out so that a margin of 2.5 mm is provided at each of end portions (opposite end portions with respect to each of the widthwise direction and the recording material feeding direction in this embodiment). For example, in the case where the large chart 100L is outputted on the recording material S with the A3 size (297 mm×420 mm), the image data in a range of 292 mm×415 mm is cut out by providing a margin of 2.5 mm at each of the end portions. Then, the large chart 100L corresponding to the image data is outputted on the recording material S with the A3 size (297 mm×420 mm) on the leading end center (line) basis. In the case where the recording material S of which width is smaller than 13 inches is used, a dimension of the halftone patch 103 at each of the end portions with respect to the widthwise direction becomes small. Further, in the case where the recording material S of which width is smaller than 13 inches is used, a margin at a trailing end portion with respect to the recording material feeding direction becomes small. As described above, on the large chart 100L, the 11 patch sets of −5 to 0 to +5 are disposed. The 11 sets of the patch sets 101 to 103 on the large chart 100L are disposed in a range of 387 mm with respect to the feeding direction so as to all within a length of 415 mm with respect to the feeding direction in the case where the size of the recording material S is the A3 size.

In this embodiment, in the case where the recording material S of which size is smaller than the A3 size (297 mm×420 mm) is used, the small chart 100S is outputted. The small chart 100S of FIG. 7 corresponds to sizes from an A5 size (short edge feeding) to a size smaller than the A3 size (297 mm×420 mm) (i.e., lengths from 210 mm to 419 mm in the feeding direction). As described above, on the small chart 100S, 10 patch sets consisting of 5 sets of −4 to 0 on a first sheet and 5 sets of +1 to +5 on a second sheet are disposed. The size of the image data on the small chart 100S is 13 inches×210 mm. With respect to the widthwise direction, the halftone patch 103 becomes small in conformity to the size of the recording material S. With respect to the feeding direction, the 5 patch sets are disposed so as to fall within a length of 167 mm in the feeding direction, and a margin of the trailing end portion becomes long in conformity to the length of the recording material S ranging from 210 mm to 419 mm. In the case of the recording material S with the length of 210 mm to 419 mm in the feeding direction, only the 5 patch sets can be formed on one sheet with respect to the feeding direction. For that reason, in order to increase the number of the patches, the chart is divided into those on two sheets, so that 10 patch sets consisting of the 5 patch sets of −4 to 0 and 5 patch sets of +1 to +5 are formed in total. Incidentally, in the case of the small chart 100S, the patch set of −5 provided on the large chart 100L is omitted.

Further, in this embodiment, the blue solid patches 101 and the black solid patches 102 are disposed so as not to overlap with each other between the front surface (first side) and the back surface (second side) of a double side chart on the recording material S. In this embodiment, a patch interval with respect to the widthwise direction is 5.4 mm. This is because a variation in patch density on the second side due to the influence of the patch density on the first side is suppressed and thus adjustment of the secondary transfer voltage on the second side is performed accurately.

Further, in this embodiment, not only a standard size but also an arbitrary size (free size) recording material S is usable by an operator inputting and designating through the operating portion 70 or the external device 200, so that the chart 100 can be outputted.

Here, a single chart 100 may be formed on one side (surface) of a single recording material S or on one side (surface) of each of a plurality of recording materials S (i.e., may be a single set of charts including a set of patch group changed stepwise in test voltage). In the above-described embodiment, each of the large chart 100La (first side) and the large chart 100 Lb (second side) corresponds to the single chart. Further, in the above-described embodiment, the small charts 100Sa (first side) on the first sheet and the second sheet correspond to the single chart as a whole. Similarly, the small charts 100Sb (second side) on the first sheet and the second sheet correspond to the single chart as a whole.

5. Operation in Adjustment Mode 5-1. Conventional Problem

Parts (a) to (c) of FIG. 15 are illustrations of an operation in a conventional adjustment mode. Part (a) of FIG. 15 is a graph showing a relationship between an adjusting value during the formation of the chart 100 (abscissa) and the secondary transfer voltage (test voltage, applied voltage) (ordinate). Part (b) of FIG. 15 is a graph showing a relationship between the adjusting value in the chart 100 (abscissa) and a brightness of the blue solid patch (ordinate). Part (c) of FIG. 15 is a graph showing a relationship between the secondary transfer voltage and the adjusting value (abscissa) and a current detected under application of each secondary transfer voltage (ordinate) during the formation of the chart 100 (herein, this relationship is referred to as a "voltage-current characteristic"). Incidentally, in this case, the image forming apparatus 1 applies the secondary transfer voltage through the constant-voltage control, and the current at that time is detected by a current detecting sensor (current detecting circuit). Further, the case where the large chart 100L as described above is formed as the chart 100 will be described as an example.

In the operation in the conventional adjustment mode, as shown in part (a) of FIG. 15, during formation of a single chart, the secondary transfer voltage is changed stepwise at a certain increment (width). For example, the secondary transfer voltage is sequentially increased at an increment of 150 V (adjusting value −5: 150 V→adjusting value −4: 300 V→adjusting value −3: 450 V). Conventionally, this increment of the secondary transfer voltage during the formation of the chart 100 is a fixed value in general.

Further, for example, when a brightness value of the blue solid patch on this chart 100 is read by the reading device 80, the relationship between the adjusting value and the brightness value as shown in part (b) of FIG. 15 is obtained. Here, part (b) of FIG. 15 shows an example of the relationship between the adjusting value and the brightness value in the case where the recording material S used for forming the chart 100 is an ordinary recording material S with a standard electric resistance based on a kind thereof.

As a recommended adjusting value of the secondary transfer voltage by the operation in the adjustment mode, in the relationship between the adjusting value and the brightness value as shown in part (b) of FIG. 15, an adjusting value at which the brightness value becomes sufficiently small (i.e., the density becomes high) is selected. In the example of FIG. 15, at the adjusting value of +5, there is a possibility that image defect ("white void") due to excessively high secondary transfer voltage occurs, and therefore, for example, the adjusting value of +1 is selected as the recommended adjusting value of the secondary transfer voltage. Incidentally, an example of a method for determining the recommended adjusting value of the secondary transfer voltage will be further described later.

Here, in the case where the above-described ordinary recording material S is used for forming the chart 100, the voltage-current characteristic during the formation of the chart 100 is as indicated by a solid line in part (c) of FIG. 15, for example. In this case, it is understood that an adjustable range of the secondary transfer voltage becomes a range enough to select the recommended value of the secondary transfer voltage. Incidentally, in the example of part (c) of FIG. 15, at the adjusting value of +1, the secondary transfer voltage is 1050 V and the secondary transfer current is 15 μA.

On the other hand, in the case where the recording material S used for forming the chart 100 is a high-resistance recording material S with an electric resistance higher than the standard electric resistance based on the kind thereof, the voltage-current characteristic during the formation of the chart 100 is as indicated by a broken line in part (e) of FIG. 15. In this case, a slope (absolute value) of the voltage-current characteristic becomes smaller than the slope in the case of the normal (ordinary) recording material S. For that reason, at the secondary transfer voltage increment of 150 V, the increment is small, so that at the secondary transfer voltage of 1650 V for the adjusting value of +5 (maximum), the secondary transfer voltage does not reach a secondary transfer voltage at which the brightness value of the blue solid patch becomes sufficiently small (i.e., the density becomes high). That is, in this case, it is understood that the adjustable range of the secondary transfer voltage becomes narrower than a range necessary to select the recommended adjusting value of the secondary transfer voltage.

Further, in the case where the recording material S used for forming the chart 100 is a low-resistance recording material S with an electric resistance lower than the standard electric resistance based on the kind thereof, the voltage-current characteristic during the formation of the chart 100 is as indicated by a dot-and-dash line in part (e) of FIG. 15. In this case, a slope (absolute value) of the voltage-current characteristic becomes larger than the slope in the case of the normal (ordinary) recording material S. For that reason, at the secondary transfer voltage increment of 150 V, the increment is large, so that the recommended value of secondary transfer voltage exists between adjacent adjusting values. For example, there is a case that an adjusting value at which not only the brightness value of the blue solid patch becomes sufficiently small (i.e., the density becomes high) but also the image defect ("white void") due to the excessively high secondary transfer voltage can be sufficiently suppressed exists between the adjusting value of −3 and the adjusting value of −4 (at the secondary transfer voltage of 500 V). That is, in this case, it is understood that the increment of the secondary transfer voltage is excessively rough for appropriately select the recommended adjusting value of the secondary transfer voltage.

5-2. Operation in Adjustment Mode in this Embodiment.

Next, an operation in an adjustment mode in this embodiment will be described. Parts (a) and (b) of FIG. 8 and parts (a) and (b) of FIG. 9 are illustrations of the operation in the adjustment mode in this embodiment. Part (a) of FIG. 8 is a graph showing a voltage-current characteristic of the chart 100 similar to that of part (c) of FIG. 15. Part (b) of FIG. 8 is a graph showing a relationship between the secondary transfer voltage and the adjusting value (abscissa) and the brightness value of the blue solid patch (ordinate) in the case where the increment of the secondary transfer voltage (test voltage, applied voltage) during the formation of the chart 100. Parts (a) and (b) of FIG. 9 are graphs each showing a relationship between the secondary transfer voltage and the adjusting value (abscissa) and the brightness value of the blue solid patch (ordinate) in the case where the increment of the secondary transfer voltage (test voltage, applied voltage) is changed during the formation of the chart 100 in accordance with this embodiment.

Incidentally, in this embodiment, the image forming apparatus 1 employs a constitution in which the secondary transfer voltage is applied through the constant-voltage control and a current at that time is detected by the current detecting sensor (current detecting circuit) 76*b*. However, the present invention is not limited to such an embodiment, but the image forming apparatus 1 may also employ a constitution in which the secondary transfer voltage is applied through the constant-current control and a voltage at that time is detected by the voltage detecting sensor (voltage detecting circuit) 76*a*. Further, in this embodiment, similarly as in the example described with reference to FIG. 15, in the case of the ordinary (normal) recording material S, the secondary transfer voltage is sequentially increased at a substantially constant increment of 150 V during formation of the single chart 100. Further, in this embodiment, the image forming apparatus 1 employs a constitution in which the brightness value of the blue solid patch of the chart 100 is read by the reading device 80 and a recommended adjusting value of the secondary transfer voltage is determined. Further, in this embodiment, the case where as the chart 100, the large chart 100L as described above is formed is used as an example.

As described above with reference to FIG. 15, as shown in part (a) of FIG. 8, in the case of the high-resistance recording material S, a slope of the voltage-current characteristic during the formation of the chart 100 becomes small. For that reason, as shown in part (b) of FIG. 8, at the secondary transfer voltage increment of 150 V, the increment is small, so that the secondary transfer voltage does not reach a secondary transfer voltage at which the brightness value of the blue solid patch becomes sufficiently small (i.e., the density becomes high).

Therefore, in this embodiment, in the case of the high-resistance recording material S, as shown in part (a) of FIG. 9, the increment of the secondary transfer voltage is changed so as to become large during the formation of the chart 100. In an example of part (a) of FIG. 9, the secondary transfer voltage increment is set at 150 V on a lower secondary transfer voltage side and is set at 300 V on a higher secondary transfer voltage side. That is, the secondary transfer voltage increment during the formation of the single chart 100 is not regular intervals. By this, even in the case of the high-resistance recording material S, in the single chart 100, the secondary transfer voltage reaches 2850 V at the adjusting value of +5 (maximum). Thus, the secondary transfer voltage can be made selectable to a range in which the brightness value of the blue solid patch becomes sufficiently low (i.e., the density becomes high). That is, an adjustable range of the secondary transfer voltage can be made a sufficient range.

Further, as described above with reference to FIG. 15, as shown in part (a) of FIG. 8, in the case of the low-resistance recording material S, a slope of the voltage-current characteristic during the formation of the chart 100 becomes large. For that reason, as shown in part (b) of FIG. 8, the brightness value of the blue solid patch abruptly becomes small relative to a change of the secondary transfer voltage (i.e., the density becomes high). That is, in this case, at the secondary transfer voltage increment of 150 V, the increment is large, so that a recommended adjusting value of the secondary transfer voltage exists between adjacent adjusting values in some instances.

Therefore, in this embodiment, in the case of the low-resistance recording material S, as shown in part (b) of FIG. 9, the increment of the secondary transfer voltage is changed so as to become small during the formation of the chart 100. In an example of part (a) of FIG. 9, the secondary transfer voltage increment is set at 150 V on a lower secondary transfer voltage side and is set at 75 V on a higher secondary transfer voltage side. That is, the secondary transfer voltage increment during the formation of the single chart 100 is not regular intervals. By this, even in the case of the low-resistance recording material S, it becomes possible to select an appropriate secondary transfer voltage capable of compatibly realizing suppression of the image defect ("roughening") due to insufficient transfer voltage and suppression of the image defect ("white void") due to excessive transfer voltage.

Here, in the case where the single chart 100 is formed on the single recording material S, in a period in which the single recording material S on which the single chart 100 is formed passes through the secondary transfer portion N2, the increment of the secondary transfer voltage is changed. Further, in the case where the single chart 100 (or one set of charts 100) is formed on a plurality of recording materials S in a divided manner, the increment of the secondary transfer voltage may be changed in a period in which either of the recording materials S passes through the secondary transfer portion N2 or may also be changed in a period corresponding to an interval between a recording material S and a subsequent recording material S.

Incidentally, for example, a constitution in which the operator selects setting of the increment of the secondary transfer voltage during the formation of the chart 100 in accordance with this embodiment depending on the kind and the state of the recording material S used for the image formation would be considered. For example, the setting of the increment in the case of each of the normal recording material S, the high-resistance recording material S, and the low-resistance recording material S which are described above can be selected in the operating portion 70 or the external device 200. However, when the operation in the adjustment mode is executed, in many cases, it is difficult that the operator accurately predicts states of various recording materials S and appropriately sets manually the increment of the secondary transfer voltage during the formation of the chart 100.

Therefore, in this embodiment, a constitution in which the controller 30 automatically selects the setting of the increment in the case of each of the above-described normal recording material S, the high-resistance recording material S, and the low-resistance recording material S on the basis of a detection result of the current detecting sensor 76*b* during the formation of the chart 100 is employed.

Incidentally, in an example shown in FIG. 9, correspondingly to an automatic selecting method of the increment in this embodiment described specifically later, in either of the cases of the high-resistance recording material S and the low-resistance recording material S, the increment on the high-voltage side was changed relative to the increment on the low-voltage side. However, for example, this changing mode of the increment may be different from the above changing mode in a constitution in which information relating to an electric resistance of the recording material S is acquired by a method of an embodiment 2 described later and then the setting of the increment is selected.

Here, in the case of the high-resistance recording material S, from the viewpoint that the transfer voltage is made an appropriate transfer voltage in the single chart as described above, it can be said that it is preferable to make the increment on the high-voltage side larger than the increment on the low-voltage side as in the above-described example. For that reason, in the constitution in which the absolute value of the test voltage is stepwise increased as in the above-described example, in the case of the high-resistance recording material S, it can be said that it is preferable to make the voltage on a final (maximum) adjusting value side larger than the voltage on a first (minimum) adjusting value side. Further, in the case of the low-resistance recording material S, from the viewpoint that the increment of the transfer voltage does not become rough in the neighborhood of the appropriate transfer voltage as described above, it can be said that it is preferable to make the increment on the low-voltage side smaller than the increment on the high-voltage side as in the above-described example. For that reason, in the constitution in which the absolute value of the test voltage is stepwise increased as in the above-described example, in the case of the low-resistance recording material S contrary to the above-described case, it can be said that it is preferable to make the voltage on the first (minimum) adjusting value side smaller than the voltage on the final (maximum) adjusting value side.

On the other hand, different from the above-described example, in the constitution in which the absolute value of the test voltage is stepwise decreased, in the case of the low-resistance recording material S contrary to the above-described case, it can be said that it is preferable to make the increment on the first (minimum) adjusting value side larger than the increment on the final (maximum) adjusting value side. In this case, in addition, an absolute value of the test voltage corresponding to the first (minimum) adjusting value may only be required to be made large so as to be equal to the test voltage corresponding to the final (maximum) adjusting value in the above-described example. Further, different from the above-described example, in the constitution in which the absolute value of the test voltage is stepwise decreased, in the case of the low-resistance recording material S similarly to the above-described case, it can be said that it is preferable to make the increment on the final (maximum) adjusting value side smaller than the increment on the first (minimum) adjusting value side.

5-3. Procedure of Operation in Adjustment Mode in this Embodiment.

Next, the operation in the adjustment mode will be described further specifically. FIG. 10 is a flowchart showing an outline of a procedure of the operation in the adjustment mode in this embodiment. Further, FIG. 11 is a schematic view showing an example of a setting screen of the adjustment mode in this embodiment. Incidentally, as described above, in this embodiment, the image forming apparatus 1 applies the secondary transfer voltage through the constant-voltage control and detects the current at that time by the current detecting sensor 76*b*. Further, in this embodiment, in the case of the normal recording material S, during the formation of the single chart 100, the secondary transfer voltage is sequentially increased with a substantially constant increment (width) of 150 V. Further, in this embodiment, the image forming apparatus 1 reads the brightness value of the blue solid patch on the chart 100 by the reading device 80 and determines the recommended adjusting value of the secondary transfer voltage. Further, in this embodiment, the case where the above-described large chart 100L is formed as the chart is described as an example. Further, in this embodiment, the case where the operator inputs an instruction from the operating portion 70 of the image forming apparatus 1 and executes the operation in the adjustment mode is described as an example. Further, for simplicity, the recording material on which the chart is formed is referred simply to as a "chart" in some instances.

The setting screen of the operation in the adjustment mode will be described. In this embodiment, the controller 30 (adjustment process portion 31*d*) causes a display portion 70*a* of the operating portion 70 to display an adjustment mode setting screen 300 as shown in FIG. 11. The setting screen 300 has a voltage setting portion 301 for setting the adjusting value of the secondary transfer voltage for the front surface (first side) and the back surface (second side) of the recording material S. In addition, the setting screen 300 has an output side selecting portion 302 for selecting whether to output the chart to one side or double (both) sides of the recording material S. Further, the setting screen 300 includes an output instructing portion (chart output button) 303 for providing an instruction to output the chart 100. Further, the setting screen 300 includes a decision portion (OK button) 304 for deciding the setting and a cancel button 305 for canceling a change setting. The controller 30 (adjustment process portion 31*d*) is capable of acquiring pieces of information on various settings inputted in the operating portion 70 through the setting screen 300 and then is capable of storing the pieces of information in the storing portions (the RAM 33, the secondary transfer voltage storage/operation portion 31*f*, and the like) as needed.

In this embodiment, before the chart 100 is outputted, the adjusting value displayed at the voltage setting portion 301 indicates a center voltage value (value corresponding to a patch of "0" on the chart) of the secondary transfer voltage (specifically the recording material part voltage Vp) during the formation of the chart 100 in the case of the normal recording material S. When the adjusting value of "0" is selected at the voltage setting portion 301 and the chart 100 is selected, in the case of the normal recording material S, the above-described center voltage value is set at a predetermined value (table value) set in advance for the recording material S currently selected. The adjusting value displayed at the voltage setting portion 301 can be changed by the operator. When an adjusting value other than "0" is selected and the chart 100 is outputted, in the case of the normal recording material S, the above-described center voltage value is changed with an adjusting value ΔV of 150 V for each adjusting value of one level, and the chart 100 is outputted. As specifically described later, in this embodiment, the controller 30 (adjustment process portion 31*d*) is capable of changing the increment of the secondary transfer voltage during the formation of the chart 100. For that reason, in the case where the increment of the secondary transfer voltage is changed as described above, the secondary transfer voltage corresponding to the adjusting value of "0" is changed from the secondary transfer voltage in the case of the normal recording material S. Further, the chart outputting button 303 is operated, whereby the chart 100 is outputted. Then, after the output of the chart 100, at the voltage setting portion 301, the recommended adjusting value of the secondary transfer voltage determined by the controller 30 on the basis of a reading result of the chart 100 by the reading device 80 is displayed. This adjusting value displayed at the voltage setting portion 301 can be changed by the operator. In the voltage setting portion 301, the OK button 104 is operated in a state in which the adjusting value determined by the above-described controller 30 or the adjusting value changed by the operator is selected, the adjusting value of the secondary transfer voltage is decided.

Incidentally, before the output of the chart 100, the adjusting value displayed at the voltage setting portion 301 may indicate the adjusting value currently set for the recording material S currently selected. Further, before the output of the chart 100, in the setting screen 300, the secondary transfer voltage other than the center voltage value, for example, the secondary transfer voltage of the first (minimum) adjusting value (for example, the adjusting value of −5 of the large chart 100L during the formation of the chart 100 may also be set.

The procedure of the operation in the adjustment mode will be described. First, when information (paper kind category, size, and the like) on the recording material S used in the operation in the adjustment mode is inputted by the operator, the controller 30 (adjustment process portion 31*d*) causes the display portion 70*a* to display the setting screen 300 of the operation in the adjustment mode (S201).

For example, the controller 301 (adjustment process portion 31*d*) causes the display portion 70*a* to display the setting screen 300 in response to an operation of a button or the like calling the setting screen 300 in the operation in the adjustment mode, provided on a recording material information input screen displayed at the display portion 70*a*. The controller 30 (adjustment process portion 31*d*) acquires the information on the recording material S inputted by the operator on the input screen and adjusts the secondary transfer voltage in association with the information on the recording material S. Incidentally, the information on the recording material S may also be acquired from information set in association with the recording material cassette 91 in advance, by selecting the recording material cassette 91 in which the recording material S used in the operation in the adjustment mode is accommodated.

Next, the controller 30 (adjustment process portion 31*d*) acquires a piece of information on setting of the center voltage value of the secondary transfer voltage during formation of the chart 100 and a piece of information on setting as to whether to output the one-side chart or the double-side chart, which are inputted by the operator on the setting screen 300 (S202). As described above, in this embodiment, the above-described center voltage value corresponds to the center voltage value in the case of the normal recording material S. Next, the controller 30 (adjustment process portion 31*d*) acquires a signal indicating that the operator operated the chart outputting button 303 on the setting screen 300 (S203). Then, in advance of the output of the chart 100, the controller 30 (adjustment process portion 31*d*) acquires a polynomial (quadratic expression in this embodiment) of two terms or more for a relationship between a voltage and a current, depending on an electric resistance of the secondary transfer portion N2 by the operation similar to the operation in the above-described ATVC (S204). Then, the controller 30 (adjustment process portion 31*d*) sets the secondary transfer voltage (test voltage) on the basis of the acquired information on the relationship between the voltage and the current and the information on the above-described center voltage value set on the setting screen 300, and carries out control so as to start the output of the chart 100 (S205). At this time, the controller 30 (adjustment process portion 31*d*) adjusts the image data of the chart 100 depending on the size of the recording material S as described above, and carries out control so as to output the chart 100 while changing the secondary transfer voltage first every 150 V. In this embodiment, the case where the large chart 100L is outputted is taken as an example, and therefore, the controller 30 (adjustment process portion 31d) carries out control so as to output the chart 100 including the 11 patch sets as described above.

Next, the controller 30 (adjustment process portion 31*d*) detects the voltage and the
current under application of the secondary transfer voltages for the adjusting values of −5, −4 and −3 by the voltage detecting sensor 76*a* and the control detecting sensor 76*b* (S206). Incidentally, the voltage value may be detected (recognized) from an output instruction value to the secondary transfer voltage source 76. Next, the controller 30 (adjustment process portion 31*d*) calculates a slope of the voltage-current characteristic on the basis of detection results of the voltage and the current under application of the secondary transfer voltages for the adjusting values of −5, −4 and −3 (S207).

Next, the controller 30 (adjustment process portion 31*d*) discriminates whether or not the slope (absolute value) of the voltage-current characteristic calculated in S207 is a predetermined lower limit threshold or less (S208). This lower limit threshold is set in advance depending on the electric resistance or the like of the recording material S for which the increment of the secondary transfer voltage is desired to be changed during the formation of the chart 100 in order to make an adjustable range of the secondary transfer voltage a sufficient range, and is stored in the ROM 32 in advance. The recording material S for which the above-described slope is the lower limit threshold or less corresponds to the high-resistance recording material S higher in electric resistance than the normal recording material S. Then, in the case where the controller 30 (adjustment process portion 31*d*) discriminated in S208 that the slope is the lower limit threshold or less, the controller 30 carries out control so that the increment of the secondary transfer voltages for the adjusting value of −3 and later is increased from 150 V to 300 V (S209). That is, the increment of the secondary transfer voltage is changed to 300 V between the adjusting value of −3 and the adjusting value of −2 and between subsequent adjacent adjusting values.

Further, in the case where the controller 30 (adjustment process portion 31*d*) discriminated in S208 that the above-described slope is not the lower limit threshold or less (i.e., is larger than the lower limit threshold), the controller 30 discriminates whether or not the above-described slope is a predetermined upper limit threshold or more (S210). This upper limit threshold is set in advance depending on the electric resistance or the like of the recording material S for which the increment of the secondary transfer voltage is desired to be changed during the formation of the chart 100 in order that the increment of the secondary transfer voltage does not become excessively rough, and is stored in the ROM 32 in advance. The recording material S for which the above-described slope is the upper limit threshold or more corresponds to the low-resistance recording material S lower in electric resistance than the normal recording material S. Then, in the case where the controller 30 (adjustment process portion 31*d*) discriminated in S210 that the slope is the upper limit threshold or more, the controller 30 carries out control so that the increment of the secondary transfer voltages for the adjusting value of −3 and later is decreased from 150 V to 75 V (S211). That is, the increment of the secondary transfer voltage is changed to 75 V between the adjusting value of −3 and the adjusting value of −2 and between subsequent adjacent adjusting values.

Further, in the case where the controller 30 (adjustment process portion 31*d*) discriminated in S210 that the above-described slope is not the upper limit threshold or more (i.e., is larger than the lower limit threshold and is smaller than the upper threshold), the controller 30 carries out the following control. That is, the controller 30 carries out control so that at the increment of the secondary transfer voltage is not changed from the 150 V during the formation of the chart 100 (S212). The recording material S for which the above-described slope is larger than the lower limit threshold and is smaller than the upper limit threshold corresponds to the normal (ordinary) recording material S possessing a normal electric resistance based on the kind of the recording material S or the like.

The controller 30 (adjustment process portion 31*d*) performs the above-described slope calculation and the selection of the setting of the increment of the secondary transfer voltage before the secondary transfer voltage is switched from the secondary transfer voltage at the adjusting value of −3 to the secondary transfer voltage at the adjusting value of −2 during the formation of the chart 100.

Thereafter, the controller 30 (adjustment process portion 31*d*) causes remaining patch sets (adjusting values of −2, −1, 0, +1, +2, +3, +4 and +5) to be transferred onto the recording material S while changing the secondary transfer voltage with the increment set in S209, S211 or S212, and then ends the output of the chart 100 (S213).

Next, the outputted chart 100 is set in the reading device 80 by the operator and is read by the reading device 80, so that information on the chart 100 including brightness information (density information) of each blue solid patch is inputted to the controller 30 (adjustment process portion 31*d*) (S214). At this time, the controller 30 (adjustment process portion 31*d*) is capable of causing the setting screen 300 to display a message prompting the operator to set the chart 100 in the reading device 80. Further, the controller 30 (adjustment process portion 31*d*) is capable of starting reading of the chart 100 by causing the operator to operate a start button (not shown) in the operating portion 70. Next, the controller 30 (adjustment process portion 31*d*) determines the recommended adjusting value of the secondary transfer voltage and causes the voltage setting portion 301 of the setting screen 300 to display the recommended adjusting value (S215). An example of processing for determining the recommended adjusting value of the secondary transfer voltage will be described later.

The adjusting value displayed at the voltage setting portion 301 of the setting screen 300 in S215 indicates a candidate for preferred setting of the secondary transfer voltage. The operator checks the chart 100 through eye observation or the like, and is capable of discriminating whether or not the adjusting value displayed on the setting screen 300 is appropriate. The operator operates the OK button 304 as it is in the case where the adjusting value displayed on the setting screen 300 is not changed. On the other hand, the operator inputs a desired adjusting value to the voltage setting portion 301 of the setting screen 300 in the case where the operator changes (manually adjusts) the adjusting value displayed on the setting screen 300, and then operates the OK button 304 on the setting screen 300. Accordingly, the controller 30 (adjustment process portion 31*d*) discriminates whether or not the change in adjusting value is not made (S216). In the case where the adjusting value is not changed and a signal indicating that the OK button 304 is operated is acquired, the controller 30 (adjustment process portion 31*d*) causes the RAM 33 (or the secondary transfer voltage storage/operation portion 31*f*) to store the adjusting value determined in S215 (S217). On the other hand, in the case where the change in adjusting value is not changed and the signal indicating that the OK button 304 is operated is acquired, the controller 30 (adjustment process portion 31*d*) causes the RAM 33 (or the secondary transfer voltage storage/operation portion 31*f*) to store the adjusting value inputted by the operator (S218). Incidentally, an adjusting value ΔV to be acquired may be stored as described later. The operation in the adjustment mode is thus ended.

During execution of subsequent job in which the recording material S for which setting of the secondary transfer voltage is made in the operation in the adjustment is used, the controller 30 (secondary transfer voltage storage operation portion 31*f*) sets the secondary transfer voltage depending on the adjusting value stored as described above until the operation in the adjustment mode is substantially executed. That is, the controller 30 (secondary transfer voltage storage/operation portion 31*f*) calculates the adjusting value ΔV on the basis of the adjusting value stored as described above and the increment of the secondary transfer voltage which was changed or not changed during the formation of the chart 100. In the case where the increment of the secondary transfer voltage was not changed during the formation of the chart 100, this adjusting value ΔV can be calculated as ΔV=(adjusting value)×150 V. In the case where the increment of the secondary transfer voltage was changed during the formation of the chart 100, the adjusting value ΔV can be calculated in conformity to the above on the basis of the adjusting value stored as described above and the increments before and after the changes. Then, the controller 30 (secondary transfer voltage storage/operation portion 31*f*) calculates the recording material part voltage Vp+ΔV after the adjustment by using the calculated adjusting value ΔV, and calculates a secondary transfer voltage Vtr (=Vb+Vp+ΔV) by using this recording material part voltage Vp+ΔV after the adjustment.

Here, an example of processing for determining the recommended adjusting value of the secondary transfer voltage in S215 will be described. The controller 30 (adjustment process portion 31*d*) acquires RGB brightness data (8 bits) of the blue solid patch corresponding to each of the adjusting values (−5 to 0 to +5) read from the chart 100 and stored in the RAM 33. Then, the controller 30 (adjustment process portion 31*d*) calculates an average brightness value of each patch by using the acquired brightness data. By this, information indicating a relationship between the adjusting value (secondary transfer voltage) and the average brightness value of the patch as shown in parts (a) and (b) of FIG. 9 is acquired. Next, the controller 30 (adjustment process portion 30*d*) calculates a standard deviation of the average brightness value for a predetermined number of patches sequentially from small patches toward large patches, for example. Then, the controller 30 (adjustment process portion 31*d*) extracts an adjusting value at which the standard deviation of the average brightness value becomes minimum. Further, the controller 30 (adjustment process portion 31*d*) selects a maximum adjusting value from adjusting values at which the recording material part voltage Vp+ΔV (absolute value) determined from each of extracted adjusting values becomes a predetermined upper limit or less. That is, within a range in which the recording material part voltage Vp+ΔV does not exceed the upper limit value, the adjusting value at which the average brightness value of the blue solid patch becomes minimum (i.e., the density becomes maximum) is selected. Incidentally, the above-described upper limit is set in advance depending on, for example, a paper kind category or the like of the recording material S from the viewpoint that an image defect due to an excessive secondary transfer voltage is suppressed. Further, the controller 30 (adjustment process portion 31*d*) determines the selected adjusting value as a recommended adjusting value of the secondary transfer voltage and causes the RAM 33 to store the determined adjusting value. By such processing, an adjusting value at which a lowering in average brightness value (increase in density) is saturated or the like is determined as the recommended adjusting value.

Incidentally, a method of determining the recommended adjusting value of the secondary transfer voltage is not limited to the above-described method. For example, the adjusting value of the secondary transfer voltage may also be determined, based on that an adjusting value in a stable brightness region where a patch brightness difference between adjacent adjusting values becomes a predetermined value or less and an adjusting value at which the average brightness value becomes minimum (i.e., the density becomes maximum) is extracted.

Referring to FIGS. 8 and 9 again, in this embodiment, in the case where a slope of the voltage-current characteristic under application of the secondary transfer voltage at adjusting values of −5, −4 and −3 is a lower limit threshold or less as shown in part (a) of FIG. 8, the following operation is performed. That is, as shown in part (a) of FIG. 9, the increment of the secondary transfer voltage is increased from 150 V to 300 V, so that remaining patches (adjusting values of −2, −1, 0, +1, +3, +4 and +5) are formed. By this, even in the case of the high-resistance recording material S smaller in slope than the normal recording material S, the increment is automatically changed, so that the appropriate adjusting value of the secondary transfer voltage can be acquired. Further, in this embodiment, in the case where a slope of the voltage-current characteristic under application of the secondary transfer voltage at adjusting values of −5, −4 and −3 is an upper limit threshold or more as shown in part (a) of FIG. 8, the following operation is performed. That is, as shown in part (a) of FIG. 9, the increment of the secondary transfer voltage is decreased from 150 V to 75 V, so that remaining patches (adjusting values of −2, −1, 0, +1, +3, +4 and +5) are formed. By this, even in the case of the low-resistance recording material S larger in slope than the normal recording material S, the increment is automatically changed, so that the appropriate adjusting value of the secondary transfer voltage capable of compatibly realizing suppression of the "roughening" and suppression of the "white void" can be acquired.

Incidentally, in this embodiment, the controller 30 automatically controlled the setting of the increment of the secondary transfer voltage on the basis of a detection result of the voltage-current characteristic during the formation of the chart 100. By this, an operation load of the operator is reduced and the setting of the increment of the secondary transfer voltage can be more appropriately controlled depending on the kind and the state of the recording material S. Particularly, in this embodiment, on the basis of the slope of the voltage-current characteristic acquired under application of the secondary transfer voltages (test voltages) of three levels, information relating to the electric resistance of the recording material S was acquired. By this, it is possible to is acquire the electric resistance of the recording material S with high accuracy. However, the information relating to the electric resistance of the recording material S can be acquired on the basis of a detection result at a current value (voltage value) acquires under application of at least one secondary transfer voltage (test voltage). For example, the information on the electric resistance of the recording material S can be acquired on the basis of the slope of the voltage-current characteristic acquired under application of secondary transfer voltages (test voltages) of two levels and on the basis of a difference between detection results of current values (voltage values) of two levels. Further, on the basis of a detection result of a current value (voltage value) of one level, the information on the electric resistance of the recording material S can be acquired from an absolute value thereof, a difference between itself and point 0, a slope of a voltage-current characteristic drawn between itself and point 0, or the like.

Thus, in this embodiment, the image forming apparatus 1 includes the image bearing member **44*b* for bearing the toner image, the transfer member 45*b* for forming the transfer portion N2 where the toner image is transferred from the image bearing member 44*b* onto the recording material S by being contacted to the image bearing member 44*b*, the applying portion 76 for applying the voltage to the transfer member 45*b*, the detecting portion 76*b* for detecting the voltage value or the current value when the applying portion 76*b* applies the voltage to the transfer member 45*b*, and the controller 30 capable of executing the operation in the adjustment mode in which the chart 100 is formed on the recording material S on which the plurality of test images are transferred under application of the plurality of test voltages to the transfer member 45*b* by the applying portion 76 and the transfer voltage applied to the transfer member 45 by the applying portion 76 during the transfer of the toner image is adjusted and in which the test voltage is changed so as to stepwise increase or decrease the absolute value thereof. In this embodiment, the above-described image bearing member 44*b* is the intermediary transfer member for feeding the toner image, transferred from another image bearing member, onto the recording material S at the transfer portion N for the transfer. Further, in this embodiment, the controller 30 is capable of changing a change width (increment width) at one level of the test voltage applied during the formation of the chart 100, on the basis of the detection result of the detecting portion 76*b* under application of the voltage to the transfer member 45*b* when the recording material S on which the chart 100 is to be formed is in the transfer portion N2. In this embodiment, the controller 30 is capable of changing the above-described change width on the basis of the detection result of the detecting portion 76*b* under application of at least one test voltage during the formation of the chart 100. In the case where the detection result of the detecting portion 76*b* indicates that the electric resistance of the recording material S at the transfer portion N2 is a predetermined value or more, the controller 30 can change the above-described change width so as to become large during the formation of the chart 100. Further, in the case where the detection result of the detecting portion 76*b* indicates that the electric resistance of the recording material S at the transfer portion N2 is the predetermined value or less, the controller 30 can change the above-described change width so as to become small during the formation of the chart 100. Further, the controller 30 is capable of changing the above-described change width during the formation of the chart 100 on the basis of the slope of the voltage-current characteristic based on the detection result of the detecting portion of the detecting portion 76*b* under application of at least two test voltages during the formation of the chart 100. In this case, when the absolute value of the slope is the predetermined value or less, the controller 30 is capable of changing the above-described change width so as to become large during the formation of the chart 100. Further, in this case, when the absolute value of the slope is the predetermined value or more, the controller 30 is capable of changing the above-described change value so as to become small during the formation of the chart 100**.

Further, in this embodiment, the image forming apparatus 1 includes the reading means 80 for acquiring the information relating to the density of the test image of the chart 100, and on the basis of the information on the density of the test image of the chart 100 acquired by the reading means 80, the controller 30 outputs the information relating to the adjusting value of the transfer voltage. Here, the chart 100 may be formed on one side of the single recording material S or may also be formed on each of the double sides of each of the plurality of the recording materials S.

As described above, according to this embodiment, the increment of the secondary transfer voltage can be changed during the formation of the chart 100. By this, it becomes possible to suppress that the adjustable range of the secondary transfer voltage becomes narrower than the necessary range in the case of the high-resistance recording material S and that it becomes difficult to adjust the secondary transfer voltage to the appropriate secondary transfer voltage because the increment of the secondary transfer voltage is rough in the case of the low-resistance recording materials. Further, according to this embodiment, the increment of the secondary transfer voltage during the formation of the chart 100 can be automatically changed on the basis of the detection result of the current detecting sensor 76*b*. By this, the operator is capable of adjusting the increment simply and appropriately without manually adjusting the increment of the secondary transfer voltage during the formation of the chart 100. That is, according to this embodiment, by simply and appropriately setting the change width at one level of the test voltage during the formation of the chart 100 depending on the recording material S, the secondary transfer voltage can be appropriately adjusted. Thus, this embodiment is effective in improving usability and compatibility with media of the image forming apparatus 1.

Embodiment 2

Next, another embodiment of the present invention will be described. The basic structure and operation of an image forming apparatus of this embodiment are the same as those of the image forming apparatus of the embodiment 1. Therefore, as to the image forming apparatus of this embodiment, elements including the same or corresponding functions or structures as those of the image forming apparatus of the embodiment 1 are denoted by the same reference numerals or symbols as those of the embodiment 1, and detailed description thereof will be omitted.

In this embodiment, the image forming apparatus 1 is capable of changing the increment of the secondary transfer voltage as a whole during formation of the chart 100 by acquiring the information on the electric resistance of the recording material S during the output of the chart 100 before patches are transferred onto the recording material S.

Parts (a) and (b) of FIG. 12 are graphs each showing a change in current detected by the current detecting sensor 76*b* before and after the recording material S enters the secondary transfer portion N2 during the output of the chart 100 and for illustrating the operation in the adjustment mode of this embodiment. In parts (a) and (b) of FIG. 12, the abscissa represents a time, and the ordinate represents a current. Part (a) of FIG. 12 shows the case of the high-resistance recording material S, and part (b) of FIG. 12 shows the case of the low-resistance small S.

Incidentally, similarly as in the embodiment 1, in this embodiment, the image forming apparatus 1 employs a constitution in which the secondary transfer voltage is applied through the constant-voltage control and a current at that time is detected by the current detecting sensor (current detecting circuit) 76*b*. However, the present invention is not limited to such a constitution, but the image forming apparatus 1 may also employ a constitution in which the secondary transfer voltage is applied through the constant-current control and a voltage at that time is detected by the voltage detecting sensor (voltage detecting circuit) 76*a*.

In this embodiment, when the chart 100 is outputted, the predetermined voltage is applied to the secondary transfer roller 45*b* through the constant voltage control from before the recording material S enters the secondary transfer portion N2, and the output at that time is detected by the current detecting sensor 76*b*. By this, information of progression of the current as shown in FIG. 12 is acquired. The current value before the leading end of the recording material (sheet) S on which the chart 100 is formed enters the secondary transfer portion N2 with respect to the feeding direction fluctuates by an electric resistance non-uniformity of the secondary transfer roller 45*b* with respect to the circumferential direction in some instances, but is determined principally by the electric resistance of the secondary transfer roller 45*b*. Then, when the leading end of the recording material S with respect to the feeding direction enters the secondary transfer portion N2, the electric resistance of the recording material S is added, so that the current value lowers. The lowering amount of this current value (herein, referred to as a "current lowering amount" changes due to the electric resistance of the recording material S. For that reason, as shown in part (a) of FIG. 12, in the case of the high-resistance recording material S or a recording material S left standing in an environment (NL (normal temperature/low humidity) environment) in which the electric resistance of the recording material S becomes high, the above-described current lowering amount becomes large. On the other hand, in the case of the low-resistance recording material S or a recording material S left standing in an environment (HH (high temperature/high humidity) environment) in which the electric resistance of the recording material S becomes low, the above-described current lowering amount becomes small.

Thus, on the basis of the detection result of the current detecting sensor 76*b*, the current lowering amount due to entrance of the leading end of the recording material S with respect to the feeding direction into the secondary transfer portion N2 can be detected. Then, depending on this current lowering amount, the increment of the secondary transfer voltage during the formation of the chart 100 can be changed. Specifically, in this embodiment, in the case where the above-described current lowering amount is not large or small by a certain amount, the recording material S is regarded as being one possessing a standard electric resistance based on the kind or the like of the recording material S, so that the increment of the secondary transfer voltage during the formation of the chart 100 is set at 150 V. Further, in the case where the above-described current lowering amount is large by the certain amount or more, the electric resistance of the recording material S is large, and therefore, the increment of the secondary transfer voltage during the formation of the chart 100 is changed so as to be increased from 150 V to 300 V. On the other hand, in the case where the above-described current lowering amount is small by the certain amount or more, the electric resistance of the recording material S is small, and therefore, the increment of the secondary transfer voltage during the formation of the chart 100 is changed so as to be decreased from 150 V to 75 V. Thus, in this embodiment, on the basis of the current lowering amount, the increment of the secondary transfer voltage during the formation of the chart 100 is changed as a whole.

Incidentally, the information on the electric resistance of the recording material S on which the chart 100 is formed can be accurately acquired by being acquired on the basis of the current lowering amount acquired from a difference between current values before and after the leading end of the recording material S with respect to the feeding direction enters the secondary transfer portion N2. However, the present invention is not limited thereto, but the information on the electric resistance of the recording material S may also be determined on the basis of a ratio of one detection result to the other detection result of detection results of the current values (voltage values) before and after the leading end of the recording material S with respect to the feeding direction enters the secondary transfer portion N2. Further, the information on the electric resistance of the recording material S on which the chart 100 is formed can be acquired from a detection result of at least one current large in a period from the entrance of the recording material S into the secondary transfer portion N2 until a first patch is transferred onto the recording material S. For example, the information on the electric resistance of the recording material S may also be acquired by applying a method similar to the method of the embodiment 1, to this embodiment. In this case, it is possible to acquire the information on the electric resistance of the recording material S on the basis of a detection result of current values of a plurality of levels in the period from the entrance of the recording material S into the secondary transfer portion N2 until the first patch is transferred onto the recording material S. That is, it is possible to acquire the information on the electric resistance of the recording material S on the basis of the detection result of the current value (or the voltage value) at one point or a plurality of points when the recording material S is in the secondary transfer portion N2 similarly as in the embodiment 1. For example, it is possible to acquire the information on the electric resistance of the recording material S on the basis of the slope of the voltage-current characteristic acquired from the current values (or the voltage values) of a plurality of levels such as two levels or three levels. Further, for example, on the basis of a difference between detection results of the current values (or the voltage values) of the time levels, it is possible to acquire the information on the electric resistance of the recording material S. Further, for example, on the basis of the detection result of the current value (or the voltage value) of one level, it is possible to acquire the information on the electric resistance of the recording material S from an absolute value thereof, a difference between itself and point 0, or the slope of the voltage-current characteristic drawn between itself and the point 0.

Further, the predetermined voltage applied to the secondary transfer roller 45*b* for acquiring the information on the electric resistance of the recording material S on which the chart 100 is formed may be the same as or different from either one of the secondary transfer voltages (test voltages) during the formation of the chart 100.

Further, in the case where the chart 100 is formed on the plurality of recording materials S in the divided manner, the information on the electric resistance of the first recording material S may only be required to be acquired. However, in the case where the chart 100 is formed on the plurality of recording materials S in the divided manner, information on the electric resistance of a plurality (which may be all) of recording materials S may also be acquired. In this case, as regards the test image formed on the recording material S for which the information on the electric resistance was acquired, it is possible to acquire the increment of the secondary transfer voltage on the basis of the acquired information.

Next, the operation in the adjustment mode will be described further specifically. FIG. 13 is a flowchart showing an outline of a procedure of the operation in the adjustment mode in this embodiment. Incidentally, as described above, in this embodiment, the image forming apparatus 1 applies the secondary transfer voltage through the constant-voltage control and detects the current at that time by the current detecting sensor 76*b*. Further, in the procedure of FIG. 13, processes similar to the processes in the procedure of FIG. 10 described in the embodiment 1 will be appropriately omitted from description.

Processes of S301 to S305 in FIG. 13 are similar to the processes of S201 to S205, respectively, in FIG. 10.

Next, the controller 30 (adjustment process portion 31*d*) causes the current detecting sensor 76*b* to detect the current values before and after the leading end of the recording material S with respect to the feeding direction on which the chart 100 is formed enters the secondary transfer portion N2 (S306). By this, information of progression of the current as shown in FIG. 12 is acquired. Next, the controller 30 (adjustment process portion 31*d*) calculates the current lowering amount from the difference between current values before and after the leading end of the recording material S with respect to the feeding direction enters the secondary transfer portion N2 (S307). For example, the controller 30 (adjustment process portion 31*d*) is capable of calculating the above-described current lowering amount from a difference between a current value at a time, before a lapse of a predetermined time, when the leading end of the recording material S with respect to the feeding direction reaches the secondary transfer portion N2 and a current value at a time after a lapse of a predetermined time from the arrival (i.e., in a period corresponding to a sheet interval). A detection timing before the above-described arrival may preferably be a timing when a value reflecting the electric resistance of the secondary transfer portion N2 which is principally the electric resistance of the secondary transfer roller 45*b* can be stably detected. Further, a detection timing after the above-described arrival may preferably be a timing when a value reflecting the electric resistance of the secondary transfer portion N2 to which the electric resistance of the recording material S was added can be stably detected.

Next, the controller 30 (adjustment process portion 31*d*) discriminates whether or not the current lowering amount calculated in S307 is a predetermined upper limit threshold or more (S308). This upper limit threshold is set in advance depending on the electric resistance or the like of the recording material S for which the increment of the secondary transfer voltage is desired to be made different from the increment of the secondary transfer develop in the case of the normal recording material S in order to make an adjustable range of the secondary transfer voltage a sufficient range, and is stored in the ROM 32 in advance. The recording material S for which the current lowering amount is the upper limit threshold or more corresponds to the high-resistance recording material S higher in electric resistance than the normal recording material S. Then, in the case where the controller 30 discriminated in S308 that the current lowering amount is the upper limit threshold or more, the controller 30 carries out control so that the increment of the secondary transfer voltages during the formation of the chart 100 is made 300 V larger than 150 V in the case of the normal recording material S (S309).

Further, in the case where the controller 30 (adjustment process portion 31*d*) discriminated in S308 that the above-described current lowering amount is not the upper limit threshold or more (i.e., is larger than the upper limit threshold), the controller 30 discriminates whether or not the above-described current lowering amount is a predetermined lower limit threshold or less (S310). This lower limit threshold is set in advance depending on the electric resistance or the like of the recording material S for which the increment of the secondary transfer voltage is desired to be made different from the increment of the secondary transfer voltage in the case of the normal recording material S in order that the increment of the secondary transfer voltage does not become excessively rough, and is stored in the ROM 32 in advance. The recording material S for which the above-described current lowering amount is the lower limit threshold or less corresponds to the low-resistance recording material S lower in electric resistance than the normal recording material S. Then, in the case where the controller 30 discriminated in S310 that the current lowering amount is the lower limit threshold or less, the controller 30 carries out control so that the increment of the secondary transfer voltages during the formation of the chart 100 is made 75 V smaller than 150 V in the case of the normal recording material S (S311).

Further, in the case where the controller 30 (adjustment process portion 31*d*) discriminated in S310 that the above-described current lowering amount is not the lower limit threshold or more (i.e., is larger than the lower limit threshold and is smaller than the upper threshold), the controller 30 carries out the following control. That is, the controller 30 carries out control so that at the increment of the secondary transfer voltage is not changed from the 150 V, in the case of the normal recording material S during the formation of the chart 100 (S312). The recording material S for which the above-described current lowering amount is larger than the lower limit threshold and is smaller than the upper limit threshold corresponds to the normal (ordinary) recording material S possessing a normal electric resistance based on the kind of the recording material S or the like.

The controller 30 (adjustment process portion 31*d*) performs the above-described current lowering amount calculation and the selection of the setting of the increment of the secondary transfer voltage before a start of transfer of the first patch onto the recording material S by the first adjusting value of the secondary transfer voltage during the output of the chart 100.

Thereafter, the controller 30 (adjustment process portion 31*d*) causes all the patch sets (adjusting values of −5, −4, −3, −2, −1, 0, +1, +2, +3, +4 and +5) to be transferred onto the recording material S while changing the secondary transfer voltage with the increment set in S309, S311 or S312, and then ends the output of the chart 100 (S313).

Processes of S314 to S318 in FIG. 13 are similar to the processes of S214 to S218, respectively, in FIG. 10.

In this embodiment, in the case where the current lowering amount due to the entrance of the leading end of the recording material S with respect to the feeding direction, on which the chart 100 is formed into the secondary transfer portion N2, is the upper limit threshold or more, all the increments of the secondary transfer voltages during the formation of the chart 100 are increased from 150 V in the case of the normal recording material S to 300 V. By this, even in the case of the high-resistance recording material S, the increment is automatically changed, so that an appropriate adjusting value of the secondary transfer voltage can be acquired. Further, in this embodiment, in the case where the above-described current lowering amount is the upper lower limit threshold or more less, all the increments of the secondary transfer voltages during the formation of the chart 100 are decreased from 150 V in the case of the normal recording material S to 75 V. By this, even in the case of the low-resistance recording material S, the increment is automatically changed, so that an appropriate adjusting value of the secondary transfer voltage capable of compatibly realizing the suppression of the "roughening" and the suppression of the "white void" is used.

Incidentally, similarly as in this embodiment, the information on the electric resistance of the recording material S, and on the basis of a result thereof, the increment of the secondary transfer voltage may also be changed during the formation of the chart 100 similarly as described in the embodiment 1.

Thus, in this embodiment, on the basis of the detection result of the detecting portion 76*b* under application of the voltage to the transfer member 45*b* when the recording material S on which the chart 100 is to be formed is present in the transfer portion N2, the controller 30 is capable of changing the change width (increment width) at one level of the test voltage applied during the formation of the chart 100. In this embodiment, the controller 30 determines the change width on the basis of the detection result of the detecting portion 76*b* when the recording material S on which the chart 100 is to be formed is present in the transfer portion N2 before the first transfer of the test image, of the plurality of test images of the chart 100, onto the recording material S. The controller 30 is capable of changing the above-described change width to a first change width in the case where the detection result of the detecting portion 76*b* indicates that the electric resistance of the recording material S in the transfer portion N2 is a first value, and is capable of changing the above-described change width to a second change larger than the first change in which in the case where the detection result of the detecting portion 76*b* indicates that the electric resistance of the recording material S in the transfer portion N2 is a second value larger than the first value. Further, the controller 30 is capable of determining the above-described change width during the formation of the chart 100 on the basis of a first detection result of the detecting portion 76*b* when the recording material S on which the chart 100 is to be formed is absent in the transfer portion N2 and a second detection result of the detecting portion 76*b* when the recording material S on which the chart 100 is to be formed is present in the transfer portion N2. In this case, on the basis of a difference between the first detection result and the second detecting result, the controller 30 is capable of determining the above-described change width during the formation of the chart 100. Then, the controller 30 is capable of changing the above-described change width to the first change width when the above-described difference is a first value and is capable of changing the is above-described change width to the second change width larger than the first change width.

As described above, according to this embodiment, the operator is capable of adjusting the increment of the secondary transfer voltage as a whole during the formation of the chart 100 simply and appropriately without manually adjusting the increment of the secondary transfer voltage.

Other Embodiments

In the above, the present invention was described based on specific embodiments, but is not limited to the above-described embodiments.

In the above-described embodiments, the brightness data was acquired using the blue patch. However, the color of the patch for acquiring the brightness data is not limited to the blue, but as the color other than the blue, red or green which are secondary color may be used, and a solid patch of a single color such as YMCK may also be used. Further, halftone brightness data may be acquired.

Further, in the above-described embodiments, as the reading means, the reading device 80 for reading the chart 100 set by the operator as shown in FIG. 1 was used. However, the present invention is not limited to such an embodiment, but as the reading means, a reading device for reading the chart 100 when the chart 100 is outputted from the image forming apparatus 1 may be used. For example, as shown in FIG. 14, an in-line image sensor 86 may be provided on a side downstream of the fixing portion 46 with respect to the feeding direction of the recording material S. In this case, when the chart 100 is outputted from the image forming apparatus 1, the chart 100 is read by this image sensor 86, so that density information (brightness information) of the patch can be acquired.

Further, in the above-described embodiments, the controller determined the recommended adjusting value of the secondary transfer voltage on the basis of a result read by the reading means. By this, it becomes possible to reduce the operation load on the operator and therefore is preferred. However, the present invention is not limited to such an embodiment, but the operator may also determine the adjusting value by checking the chart outputted in the operation in the adjustment mode through eye observation or by using a calorimeter.

Further, in the above-described embodiments, setting of the increment of the transfer voltage (test voltage) during the formation of the chart is made for each of three sections of electric resistances (normal, high resistance, and low resistance) of the recording materials, but the present invention is not limited to such an embodiment. For example, the setting of the increment of the transfer voltage (test voltage) during the formation of the chart may also be made for each of two sections, such as combinations of a normal electric resistance side and a high resistance side, the normal electric resistance side and a low resistance side, and the low resistance side and the high resistance side. Further, the setting of the increment of the transfer voltage (test voltage) during the formation of the chart may also be made for each of four or more sections.

Further, in the above-described embodiments, the secondary transfer voltage was adjusted by using the adjusting value corresponding to the predetermined adjusting value, but the adjusting value may also be directly set through a setting screen, for example.

Further, in the above-described embodiments, the operation performed at the operating portion of the image forming apparatus can also be performed by the external device. That is, the case where the operation in the adjustment mode is executed by the operation through the operating portion 70 of the image forming apparatus 1 by the operator was described, but the operation in the adjustment mode may also be executed by the operation through the external device 200 such as the personal computer. In this case, setting similar to the setting in the above-described embodiments can be made through a screen displayed on the display portion of the external device 200 by a driver program for the image forming apparatus 1 installed in the external device 200.

Further, description was omitted in the above-described embodiments, but the detection result of the current or the detection result of the voltage may be an average (value) of a plurality of sampling values acquired at a predetermined sampling interval in a certain detection timing (for example, at the time when the transfer voltage corresponding to a predetermined adjusting value is applied, or the like time).

Further, in the case where the transfer voltage is subjected to the constant-voltage control, the voltage value may also be detected (recognized) from an output instruction value to the voltage source, and in the case where the transfer voltage is subjected to the constant-current control, the current value may also be detected (recognized) from an output instruction value to the voltage source.

Further, in the above-described embodiments, the constitution in which the secondary transfer voltage was subjected to the constant-voltage control was described, but the secondary transfer voltage may also be subjected to the constant-current control. In the above-described embodiments, in the constitution in which the secondary transfer voltage was subjected to the constant-voltage contact, the secondary transfer was adjusted by adjusting the target voltage under application of the secondary transfer voltage in the operation in the adjustment mode. In the case of the constitution in which the secondary transfer voltage is subjected to the constant-current control, the secondary transfer voltage can be adjusted by adjusting a target current under application of the secondary transfer voltage in the operation in the adjustment mode. In the increment (change width at one level) of the transfer voltage (test voltage), in addition to the change width of the voltage value during the constant-voltage control, the change width of the current value during the constant-current control may also be included.

Further, the present invention is not limited to the image forming apparatus of the tandem type, but is also applicable to image forming apparatuses of other types. In addition, the image forming apparatus is not limited to the full-color image forming apparatus, but may also be a monochromatic or mono-color image forming apparatus. Further, the present invention can be carried out in various uses, such as printers, various printing machines, copying machines, facsimile machines, and multi-function machines.

Further, the present invention can be applied equally to a monochromatic image forming apparatus including only one image forming portion, for example. In this case, the present invention is applicable to a transfer portion where the toner image is directly transferred from the photosensitive drum or the like as the image bearing member onto the recording material.

According to the present invention, depending on the recording material, the change width, at one level, of the test voltage during the formation of the chart is simply and appropriately set, so that it becomes possible to adjust the transfer voltage to be applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-052483 filed on Mar. 25, 2021, which is hereby incorporated by reference herein in its entirety.

What is claimed is:

1. An image forming apparatus comprising:

an image forming portion configured to form a toner image;

an image bearing member configured to bear the toner image formed by said image forming portion;

a transfer member configured to form a transfer portion where the toner image is transferred from said image bearing member onto a recording material;

an applying portion configured to apply a voltage to said transfer member;

a detecting portion configured to detect a voltage value or a current value when said applying portion applies the voltage to said transfer member; and a controller configured to execute an operation in a mode of outputting a chart, which is formed by transferring a plurality of test toner images from said image bearing member onto the recording material, for adjusting a transfer voltage to be applied to said transfer member during image formation, the plurality of test toner images being formed by applying a plurality of different test voltages to said transfer member, wherein the plurality of test toner images include a first test toner image and a second test toner image, the first test toner image being transferred to the recording material by a first test voltage and the second test toner image being transferred to the recording material by a second test voltage, and wherein said controller causes said applying portion to apply a predetermined voltage to said transfer member when the recording material on which the chart is to be formed is in the transfer portion, and executes the operation in the mode so as to change the first test voltage and the second test voltage based on a detection result detected by said detecting portion when the predetermined voltage is applied.

2. The image forming apparatus according to claim 1, wherein the predetermined voltage is a first predetermined voltage, and wherein said controller is configured to apply the first predetermined voltage and a second predetermined voltage to said transfer member when the recording material on which the chart is to be formed is in the transfer portion and to change the first test voltage and the second test voltage based on a first detection result detected by said detecting portion in application of the first predetermined voltage and a second detection result detected by said detecting portion in application of the second predetermined voltage.

3. The image forming apparatus according to claim 2, wherein said controller sets the first test voltage and the second test voltage based on a difference between the first detection result and the second detection result.

4. The image forming apparatus according to claim 3, wherein said controller sets a difference between the first test voltage and the second test voltage to be greater than a predetermined difference set based on a type of the recording material on which the chart is to be formed when the difference between the first detection result and the second detection result is greater than a threshold value.

5. The image forming apparatus according to claim 3, wherein said controller sets a difference between the first test voltage and the second test voltage to be less than a predetermined difference set based on a type of the recording material on which the chart is to be formed when the difference between the first detection result and the second detection result is greater than a threshold value.

* * * * *